United States Patent
Paaske et al.

(10) Patent No.: US 7,774,619 B2
(45) Date of Patent: Aug. 10, 2010

(54) SECURE CODE EXECUTION USING EXTERNAL MEMORY

(75) Inventors: Timothy R. Paaske, San Jose, CA (US); Jeffrey C. Glover, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 1247 days.

(21) Appl. No.: 11/250,265

(22) Filed: Oct. 13, 2005

(65) Prior Publication Data
US 2006/0107032 A1    May 18, 2006

Related U.S. Application Data

(60) Provisional application No. 60/628,795, filed on Nov. 17, 2004, provisional application No. 60/667,350, filed on Mar. 31, 2005.

(51) Int. Cl.
G06F 11/30    (2006.01)
(52) U.S. Cl. .................................. 713/191; 713/187
(58) Field of Classification Search .............. 380/282, 380/285; 713/187, 191; 719/312
See application file for complete search history.

(56) References Cited

U.S. PATENT DOCUMENTS

| | | | |
|---|---|---|---|
| 6,327,652 B1 * | 12/2001 | England et al. | 713/2 |
| 6,615,351 B1 * | 9/2003 | Sedlak et al. | 713/172 |
| 6,976,163 B1 * | 12/2005 | Hind et al. | 713/156 |
| 6,993,648 B2 * | 1/2006 | Goodman et al. | 713/2 |
| 7,069,452 B1 * | 6/2006 | Hind et al. | 713/1 |
| 7,484,105 B2 * | 1/2009 | Goodman et al. | 713/191 |
| 7,522,732 B2 * | 4/2009 | Whitehead | 380/286 |
| 7,529,919 B2 * | 5/2009 | Lampson et al. | 713/1 |
| 2005/0021968 A1 * | 1/2005 | Zimmer et al. | 713/176 |

\* cited by examiner

Primary Examiner—Kimyen Vu
Assistant Examiner—April Y Shan

(57) ABSTRACT

New code routines for a secure system (e.g., a TPM) are stored in a memory (e.g., a flash memory) that is located external to the secure system. For example, a chip may include a TPM and an external flash memory may be connected to the chip. New routines for the TPM may then be stored in the flash. A function table may be used to determine whether a given function to be executed by the TPM is stored in on-chip memory (e.g., ROM) or in the flash. New function tables may be stored in the flash. For example, when a new set of functions is loaded into the flash, a new function table that references the new functions also may be loaded into the flash.

15 Claims, 10 Drawing Sheets

SECURE CODE EXECUTION USING EXTERNAL MEMORY

CROSS-REFERENCE TO RELATED APPLICATION(S)

This application claims the benefit of U.S. Provisional Patent Application No. 60/628,795, filed Nov. 17, 2004, and U.S. Provisional Patent Application No. 60/667,350, filed Mar. 31, 2005, the disclosure of each of which is hereby incorporated by reference herein.

TECHNICAL FIELD

This application relates to processing systems and, more specifically, to an upgradeable and secure computing system.

BACKGROUND

A variety of security techniques are known for protecting information in and controlling the operation of a computing device such as a personal computer ("PC"), a server or a mobile device. For example, physical and/or cryptographic techniques may be employed to control access to the computing device and to data stored in the computing device.

Physical security techniques may include locating the computing device in a secure location, locking the computing device in an enclosure, protecting integrated circuits (i.e., chips) from invasive monitoring by encapsulating the chips in, for example, an epoxy.

Cryptographic techniques may include one or more of encryption, decryption, authentication, signing and verification. In some applications data encryption and decryption techniques may be used to prevent unauthorized applications or persons from accessing data stored in the computing device. For example, security passwords that are used to restrict access to a PC may be stored on the PC in an encrypted form. The operating system may then decrypt the password when it needs to compare it with a password typed in by a user.

In some applications, authentication techniques may be used to verify that a given set of data is authentic. For example, when a server receives a message from a remote client, authentication information associated with the message may be used to verify that the message is from a specific source. In this way, the server may ensure that only authorized clients access the applications and data provided by the server.

Various standards have been developed to enhance the level of trust for users of computing systems. For example, the Trusted Computing Group organization has developed standards for a platform known as a trusted platform module ("TPM"). A TPM may provide a set of cryptographic capabilities that enable certain computer functions to be securely executed within the TPM environment (e.g., hardware). In a typical embodiment, a TPM (e.g., an integrated circuit incorporating TPM hardware and code) may be incorporated into a computer. Also, requirements such as FIPS 140-2 have been developed that relate to methods of upgrading firmware using approved authentication techniques.

The secure protection provided by systems such as TPMs may make it more difficult to upgrade the systems in the field. For example, in some applications the upgrade process must satisfy the system's security requirements or the upgrade may need to be performed by actually replacing one or more components in the system. These factors may adversely affect the cost of the system. Accordingly, a need exists for improved techniques for upgrading secure systems.

SUMMARY

A system and/or method of providing code for a system, substantially as shown in and/or described in connection with at least one of the figures, as set forth more completely in the claims.

BRIEF DESCRIPTION OF THE DRAWINGS

These and other features, aspects and advantages of the present invention will be more fully understood when considered with respect to the following detailed description, appended claims and accompanying drawings, wherein:

Figure 1:
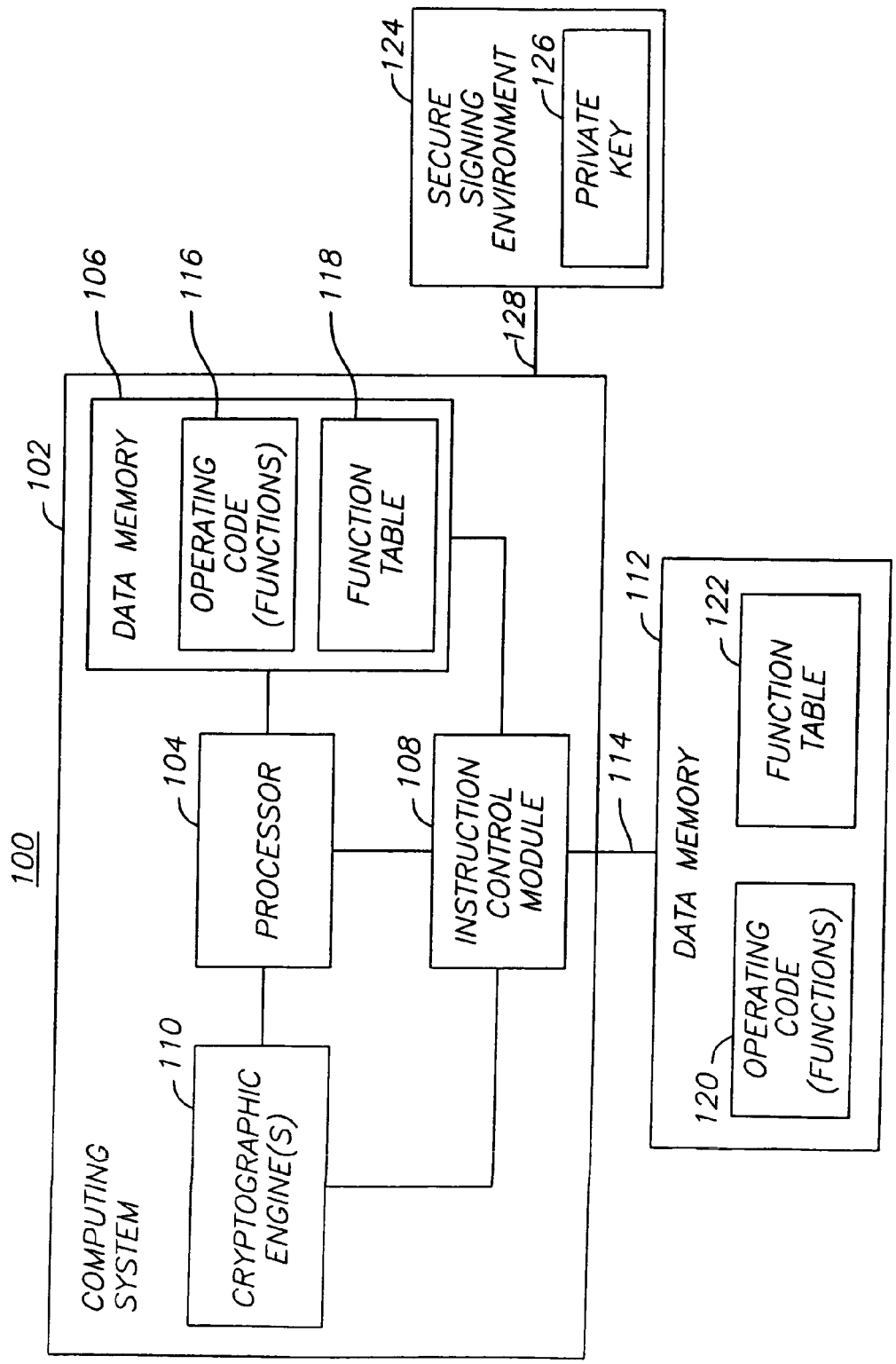
FIG. 1 is a simplified block diagram of one embodiment of a system constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention. For example, references to specific structures and processes in the disclosed embodiments should be understood to be but one example of structures and processes that may be used in these or other embodiments in accordance with the teachings provided herein. Accordingly, otherwise restrictive nomenclatures such as "is," "are," etc. should be understood to include less restrictive meanings such as "may be," etc. For convenience, an embodiment of a system constructed or a method practiced according to the invention may be referred to herein simply as an "embodiment." References to "an" or "one" embodiment in this discussion are not necessarily to the same embodiment, and such references mean at least one.

FIG. 1 illustrates one embodiment of a secure system 100 constructed in accordance with the invention. A computing system 102 includes a processor 104, a first data memory 106, an instruction control module 108 and one or more cryptographic engine(s) 110. In a typical embodiment the computing system 102 comprises a single integrated circuit (i.e., chip). A second data memory (e.g., an external memory) 112 connects to the computing system 102 via a data bus 114.

In general, as treated herein the first data memory has some attribute that makes it impossible or undesirable to alter its contents after it has been deployed in the field. Typically, the first data memory is not reprogrammable. For example, it may be a read-only memory ("ROM"). In addition and/or alternatively, the first data memory may have an attribute of being located within an associated computing system (e.g., TPM) and/or on the same integrated circuit as the associated computing system. These or other attributes may make it impossible or undesirable to alter the contents of the memory. For convenience, the terms internal memory, internal ROM, on-chip memory, on-chip ROM and instruction ROM may be used herein to refer to a memory having one or more of these or related attributes.

In general, as treated herein the second data memory refers to a memory that is reprogrammable. Such a memory also may have a characteristic of being located outside of an associated computing system (e.g., TPM) and/or on a different integrated circuit than the associated computing system. For convenience, the terms external memory, external flash, flash memory, off-chip memory and off-chip flash may be used herein to refer to a memory having one or more of these or related attributes.

In some embodiments the first data memory (e.g., an instruction memory) 106 stores operating code (e.g., functions) 116 and a function table 118 that may be used to determine where a given function resides in the data memory 106. When the data memory 106 comprises an internal memory the instruction code 116 and function table 118 may be loaded into the internal memory when the chip is manufactured.

In some embodiments once the system 100 is deployed in the field (e.g., in a personal computer, a server, etc.), the operating code for the computing system 102 may be upgraded by downloading new operating code (e.g., functions) 120 and a corresponding function table 122 into the second data memory 112. For example, the new operating code 120 may contain one or more new functions and/or modified versions of one or more of the original functions 116. In this case the new function table 122 may specify the locations of the original, unmodified functions 116 and the locations of the new and/or modified functions 120. The instruction control module 108 may be used to assist the processor 104 in efficiently obtaining the appropriate code from a storage location in either the data memory 106 or the data memory 112.

In some embodiments the cryptographic engine(s) 110 may be used to cryptographically verify and protect the operating code 120 and the function table 122. For example, the cryptographic engine(s) 110 may be used to verify that any new operating code and function tables received by the system 100 are from a trusted source. In some embodiments this may be accomplished by verifying a cryptographic signature over the received code and function table. In addition, the cryptographic engine(s) 110 may be used to encrypt, decrypt and authenticate the operating code 120 and function table 122 that are stored in the data memory 112. By encrypting the information before storing it in the data memory 112 the computing system 102 may prevent unauthorized access to the operating code and function table stored in the data memory 112. In addition, by authenticating information retrieved from the data memory 112, the computing system may verify that any operating code 120 and function table 122 retrieved from the data memory 112 has not been tampered with or replaced by unauthorized persons or programs.

In some embodiments the trusted source may comprise an external (e.g., remote) secure signing environment 124. The environment 124 may be, for example, a FIPS Level 3 environment such as a hardware security module that provides a secure mechanism to provide data to one or more computing systems 102. This data may include, for example, new code, a function table for the new code, a secure code descriptor (e.g., including keys to be used by the computing system) and other information. The environment 124 may include cryptographic and/or physical mechanisms to protect the data to be sent to the computing system 102 and keys used by the environment 124. For example, the environment 124 may securely maintain a private key 126 that is used sign and/or encrypt the data. A corresponding public key may then be securely loaded into the computing system 102.

In this way, the computing system 102 may use the public key to verify the authenticity of any received data. For example, the environment 124 may sign new secure code and a new function table using the private key 126 and send the resulting signed data to the computing system via a communication link 128. The computing system may then use the public key to verify that the signed data is from a trusted source.

In some embodiments the secure code update scheme described herein is used in conjunction with a trusted platform module ("TPM") in a computing system. In a typical application a TPM may generate and maintain keys for the computing system. For example, a TPM may provide a set of cryptographic capabilities that enable certain computer functions to be securely executed within the TPM environment (e.g., hardware associated with the TPM). To this end the TPM may include one or more cryptographic processors that perform cryptographic operations including, for example, one or more of encryption, decryption, authentication, verification, signing and key management. Specifications for a TPM are defined by the Trusted Computing Group organization.

Figure 2:
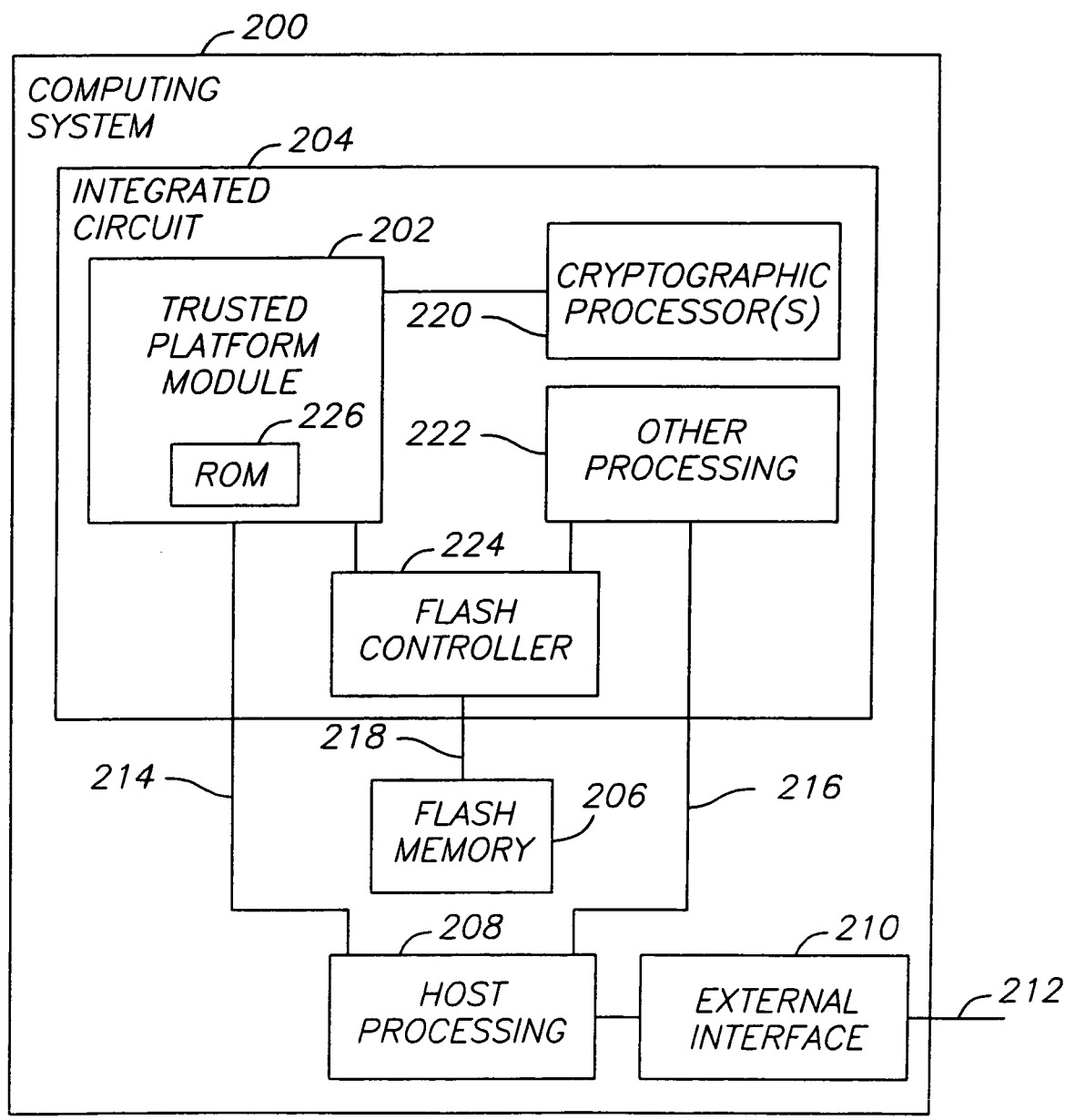
FIG. 2 is a simplified block diagram of one embodiment of a computing system constructed in accordance with the invention.

FIG. 2 illustrates one embodiment of a computing system 200 that incorporates a TPM 202. In this embodiment, the TPM 202 is implemented in an integrated circuit 204. An external data memory such as a flash memory 206 may be associated with the integrated circuit 204. The computing system also includes a host processing component 208 (e.g., a processor) that performs the basic processing for the computing system. An external interface component 210 may enable the computing system to communicate with external systems via, for example, a wired or wireless network or a removable media via an external connection 212. Data busses 214, 216 and 218 may be used to enable communication between the various components of the computing system 200.

In some embodiments some or all of the components shown in FIG. 2 may be implemented on a motherboard (not shown). In this case the busses 214 and 216 may comprise, for example, a PCI bus (e.g., PCI, PCIX or PCI-Express), a low pin count ("LPC") bus, etc.

In some embodiments the integrated circuit 204 may include other components to, for example, reduce the number of integrated circuits on the motherboard. For example, one or more cryptographic processor(s) 220 that may be used by the TPM 202 may be incorporated into the integrated circuit. In addition, the integrated circuit 204 may include one or more other processing component(s) 222 that may operate independently of the TPM 202. The integrated circuit also may include a flash controller 224 through which the TPM 202 and/or other processing component(s) 222 may access the flash memory 206.

Code routines for the TPM 202 may be stored in an internal memory 226. Several provisions may be made to ensure the security of these code routines. For example, the internal memory 226 may be a ROM that is not reprogrammable. In this case, the code routines may be incorporated into the integrated circuit when the integrated circuit is manufactured (e.g., taped out).

In one aspect of the invention the TPM 202 supports upgradeable code that may be securely stored in the flash memory 206. This allows field upgrades to be made even after the chip has taped out. In addition to fixing bugs or security holes, this flexibility may enable a manufacturer to tailor the code for each OEM that incorporates the integrated circuit 204 into its products. One advantage of using separate internal and external memories is that a relatively expensive fabrication process that may be required to generate a programmable non-volatile memory (e.g., flash memory) need not be used to fabricate the other components of the system. For example, a relatively cost effective process (e.g., a standard CMOS process) may be used to manufacture the integrated circuit 204 while the other more expensive process is used to generate the flash memory 206. In this way, a lower total system cost may be realized.

In some embodiments the majority of the code will be stored on-chip in the ROM 226. In this way, the number of accesses to the flash memory 206 (which may have a relatively slow access time) may be kept to a minimum.

In the event code needs to be upgraded or new code added, the modified and/or new code is stored in the flash memory 206 on, for example, a function-by-function basis. Accordingly, provisions are made to enable the TPM 202 to execute code stored in the flash 206 and to determine whether routines are to be executed from the internal ROM 226 or the external flash memory 206.

In some embodiments a function table (not shown in FIG. 2) is used to determine whether a given function to be executed by the TPM 202 is stored in the internal memory 226 or the flash memory 206. In some embodiments the function table may be stored in the flash memory 206. For example, when a new and/or modified set of functions is loaded into the flash memory 206, a new function table that references the new and/or modified functions also may be loaded into the flash memory 206. The TPM may then access the new function table to determine whether it should retrieve code for a given function from ROM 226 or flash memory 206.

In some embodiments new code may be loaded into the computing system via the external interface 210. In this case the TPM 202 may receive code from the host processing component 208 via bus 312 (e.g., an LPC bus). The TPM 202 may then load the code into the flash memory 206 via the flash controller 224.

In some embodiments provisions may be made in an attempt to ensure that only authorized (e.g., secure) functions and function tables are loaded into the flash memory 206. For example, information that was received may be loaded into the flash memory only when the information was cryptographically signed (e.g., using a secure key) by a trusted source. A key that corresponds to the signing key also may be securely stored locally by the TPM 202. Thus, the TPM may verify any incoming information using its key. In this way, the TPM 202 may only load information into the flash memory 206 after that information is verified.

In some embodiments the trusted source uses a protected private key to sign any code that is to be downloaded into the flash. A public key that corresponds to the private key may be securely loaded in the computing system 200 when the system is manufactured or downloaded at a later time. The public key may then be securely stored in the computing system (e.g., in the TPM 202 or elsewhere in the integrated circuit 204 or stored in encrypted form in the flash memory 206).

In some embodiments the information received by the TPM 202 may be encrypted by the trusted source or the computing system 200. In this case, a key securely stored in the computing system (e.g., in the TPM 202, the integrated circuit 204 or encrypted in the flash memory 206) may be used to decrypt the received information.

In some embodiments provisions may be made in an attempt to ensure that only secured functions and function tables are retrieved from the flash memory 206. For example, the TPM 202 may encrypt and/or authenticate information using a secure key before storing the information in the flash memory 206. In this way the TPM 202 may be configured to only execute code from flash memory 206 in the event the code was successfully decrypted and/or authenticated after it was retrieved from the flash memory 206. Again, the key(s) used for the encryption, decryption and authentication operations may be securely stored in the computing system (e.g., in the TPM 202, the integrated circuit 204 or encrypted in the flash memory 206).

Figure 3:
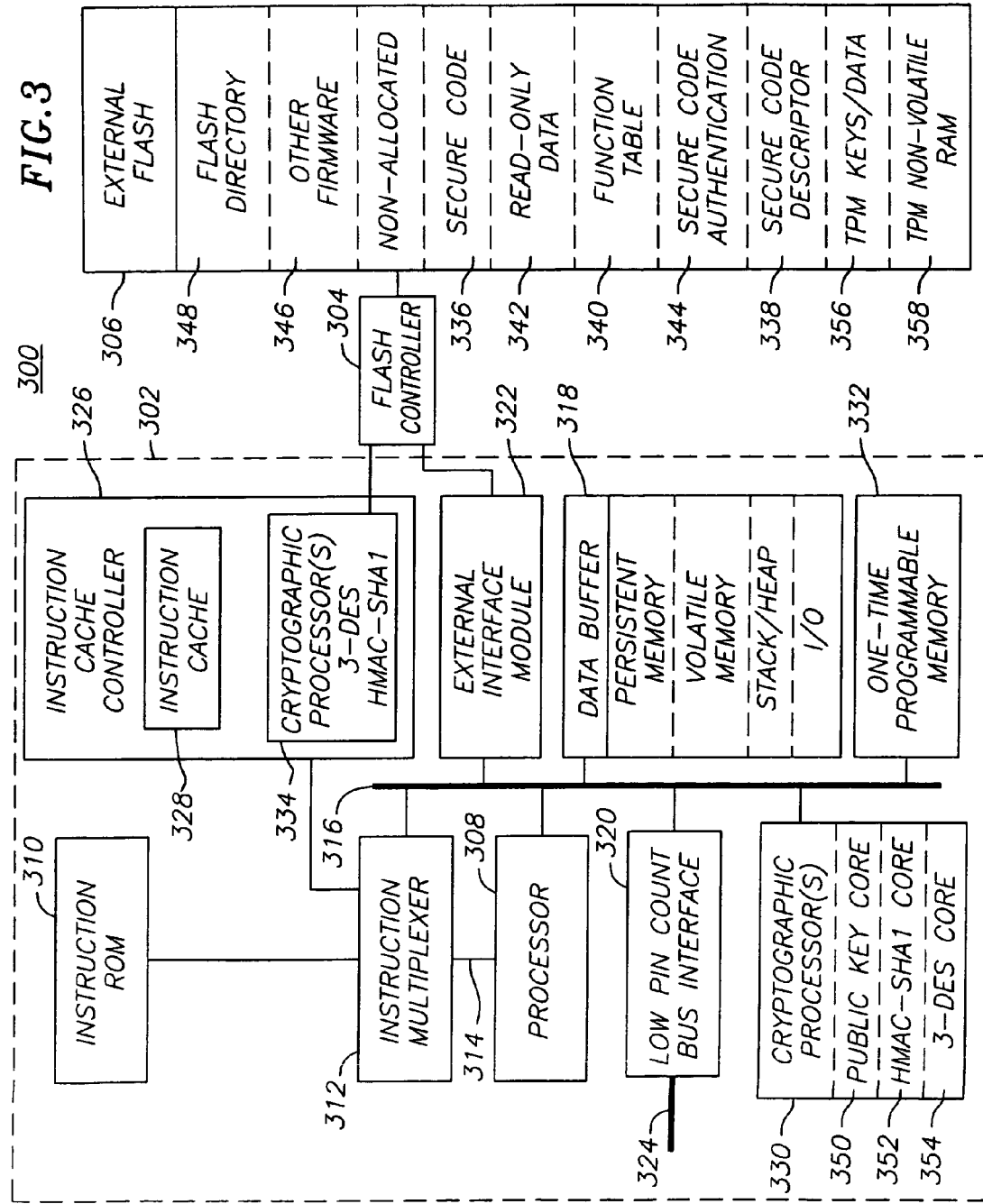
FIG. 3 is a simplified block diagram of one embodiment of a TPM system constructed in accordance with the invention.
Figure 7:
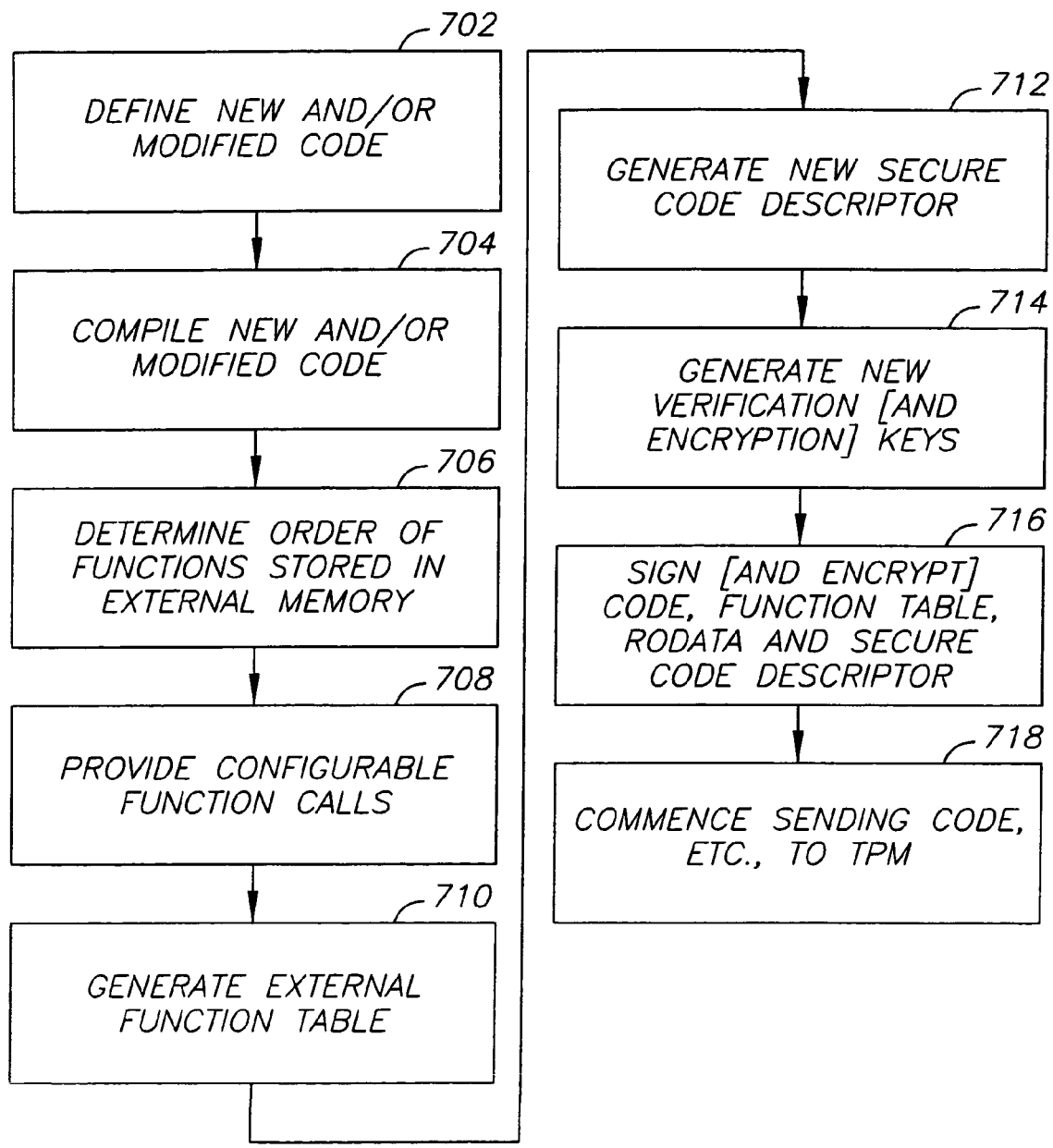
FIG. 7 is a flow chart of one embodiment of update operations that may be performed in accordance with the invention.
Figure 8:
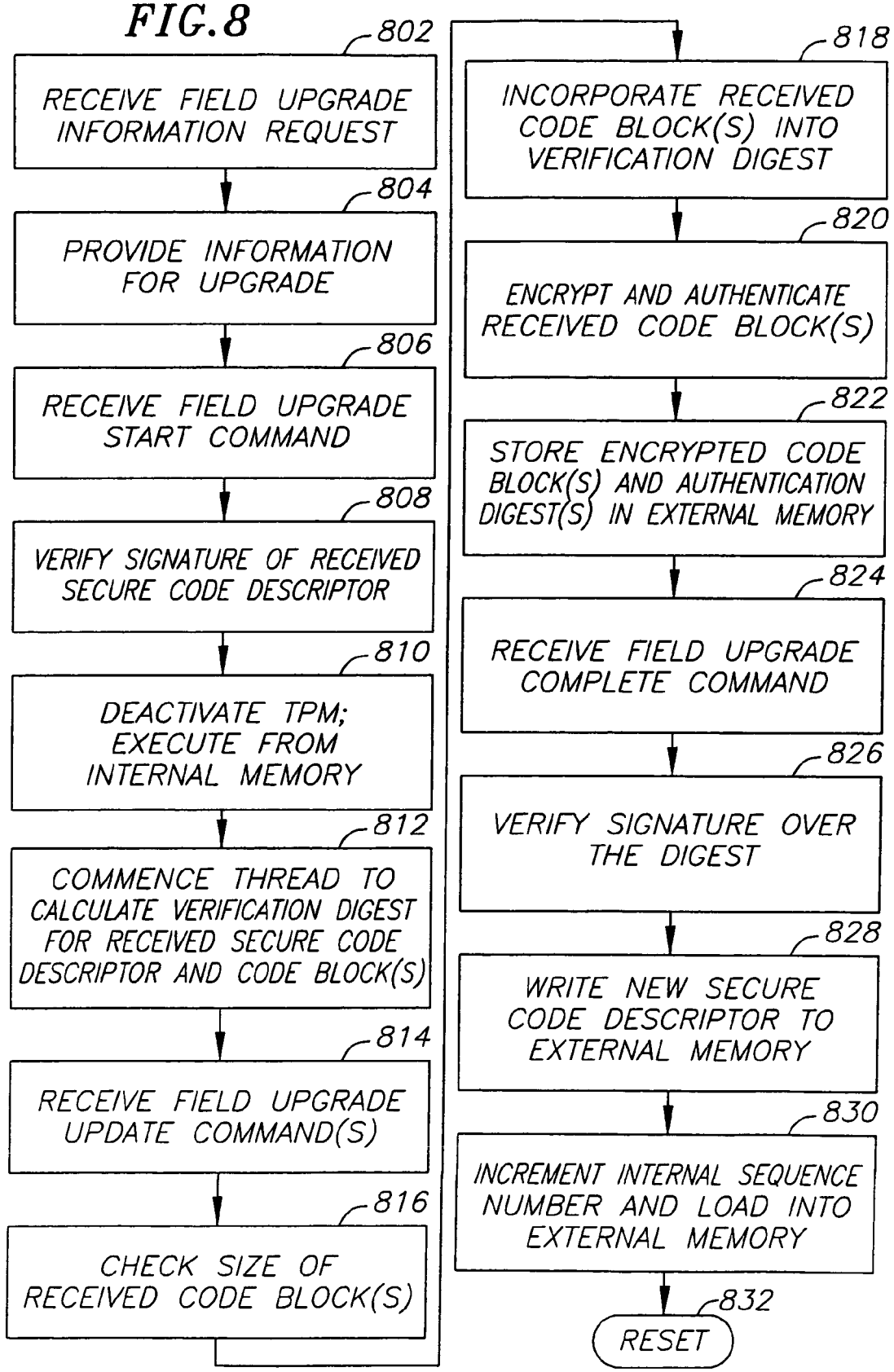
FIG. 8 is a flow chart of one embodiment of update operations that may be performed in accordance with the invention.
Figure 9:
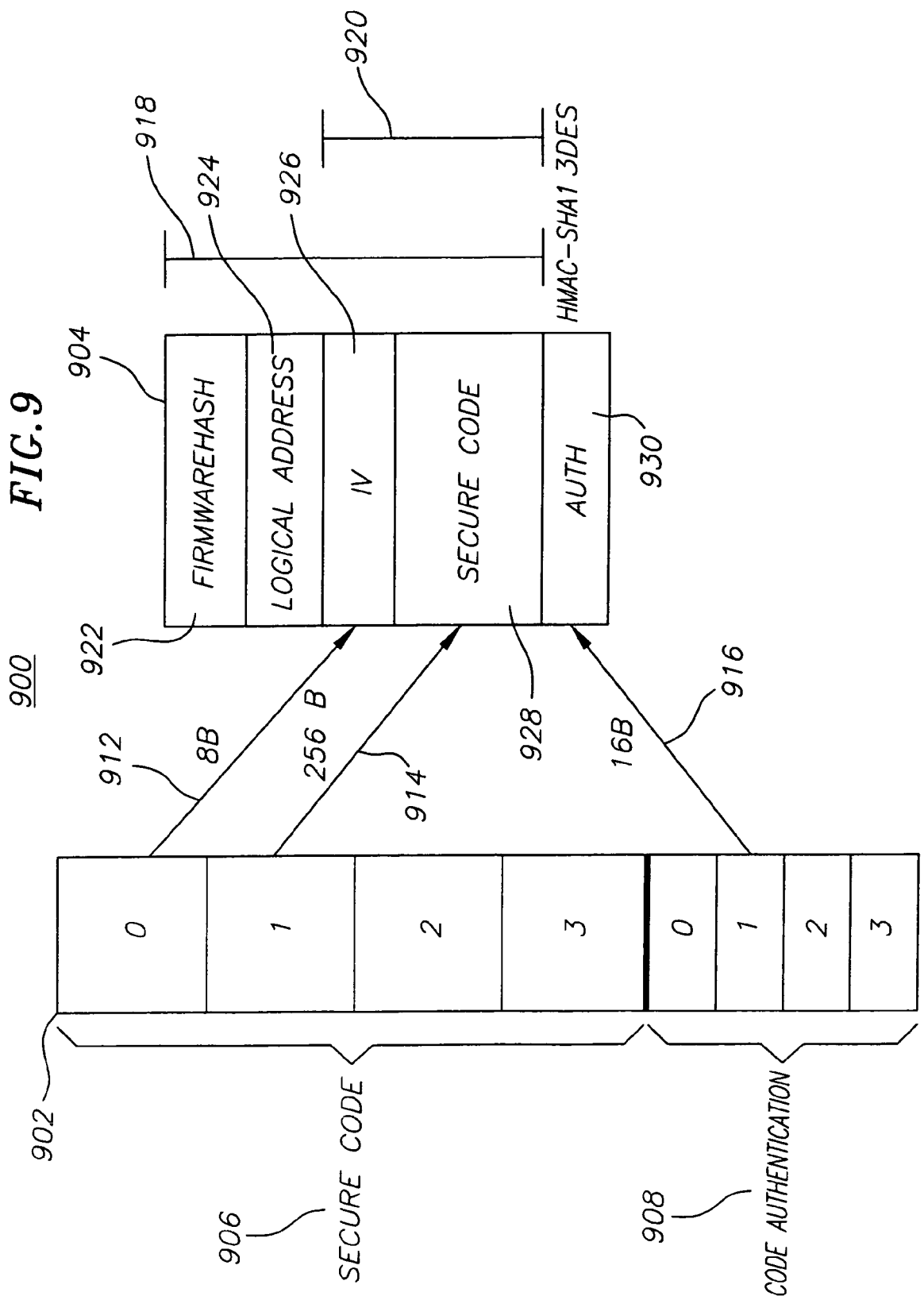
FIG. 9 is a simplified diagram relating to one embodiment of secure code operations in accordance with the invention.

Referring now to FIGS. 3-10, exemplary components and operations of a TPM-based secure system will now be discussed in more detail. FIG. 3 is a simplified block diagram of one embodiment of a TPM and associated flash memory components. FIGS. 4-8 and 10 are simplified flowcharts illustrating various embodiments of operations that may be performed in conjunction with and/or by the secure system. FIG. 9 is a simplified diagram illustrating one embodiment of how information stored in the flash memory may be authenticated.

In FIG. 3 a secure data processing system 300 includes a TPM 302, a flash controller 304 and an external data memory 306 such as a flash memory. In some embodiments the TPM 302 (and optionally the flash controller 304) may be implemented within a single integrated circuit (i.e., chip) and the flash memory 306 may be implemented within another chip (i.e., on a different die).

Several of the TPM components communicate via one or more data busses (hereafter "data bus 316"). For example, in the embodiment of FIG. 3 a processor 308, one or more data buffers (hereafter data buffer 318), an LPC bus interface 320 and an external interface module 322 are connected to the data bus 316.

The data buffer 318 provides storage for the processor 308 and other system components. In particular, the data buffer 318 may provide persistent memory, volatile memory, stack/heap space and I/O space for the processor 308. In some embodiments the persistent memory may be used to stored data (e.g., data 356 and 358 discussed below) that is loaded in from the flash memory 306.

The external interface module 322 provides a mechanism for the processor 308 or other components to access the flash memory 306. To this end the external interface module 322 communicates with the flash controller 304 to send data to and receive data from the flash memory 306.

The LPC bus interface 320 provides an interface to an LPC bus 324. As discussed in conjunction with FIG. 2, the TPM 302 may communicate with other processing components in the system (e.g., a host processor 208) via the LPC bus 324.

The processor 308 controls the main operations of the TPM 302. To this end, the processor 308 executes code that is stored in either an instruction ROM 310 or the external flash 306. In an attempt to ensure the integrity of the code executed by the TPM 302, the TPM 302 may include several secure code components. The secure code components shown in FIG. 3 include an instruction multiplexer 312, an instruction cache controller 326 and associated instruction cache 328, one or more cryptographic processor(s) 330 and a one-time programmable memory 332.

In some embodiments the instruction multiplexer 312 is used to facilitate retrieving code from the instruction ROM 310 or the external flash 306. For example, the processor 308 may request code via an instruction bus 314. Based on the particular function call associated with the code, the instruction multiplexer 312 may retrieve code from the appropriate data memory.

In some embodiments the instruction cache 328 may be used to cache code, a function table and other information that is stored in the flash 306. In some embodiments the cache comprises a fully-associative 32 kbyte instruction cache that contains 128 cache lines of 256 bytes each. It should be understood, however, that this is but one example and that an instruction cache may be implemented in various ways and store various data grouped in various ways.

The instruction cache controller 326 provides any required interfaces and processing for retrieving information from the flash memory 306, storing the information in the cache 328 and providing the information to the instruction multiplexer 312. On a cache miss, the instruction cache controller 326 may fetch, for example, a block (e.g., 256 bytes, 512 bytes, etc.) of secure code and an HMAC (e.g., 16 bytes, 20 bytes, etc.) from the external flash memory. The block of secure code may be decrypted (e.g., 3DES) and authenticated (e.g., HMAC-SHA1) against the HMAC. To this end, the instruction cache controller 326 may include one or more cryptographic processor(s) 334 for performing the decryption and authentication operations.

The cryptographic processor(s) 330 may be used to provide cryptographic processing for the TPM 302. For example, the cryptographic processor(s) 330 may include a public key core 350 for performing asymmetric cryptographic operations such as DSA, RSA and Diffie-Hellman. In addition, the cryptographic processor(s) 330 may include an authentication core 352 for performing algorithms such as HMAC-SHA1. Also, the cryptographic processor(s) 330 may include a symmetric cryptographic core 354 for performing algorithms such as DES, 3DES and AES. It should be understood that the above algorithms are examples only and that the cryptographic processor(s) 330 may implement one or more of a variety of cryptographic algorithms and perform one or more of a variety of operations.

The one-time programmable ("OTP") memory 332 may be used to store security information such as key material for security routines. For example, when the TPM 302 is manufactured security routines may be used to generate secret keys that are unique to each TPM. These keys may then be stored in the OTP memory 332. Moreover, provisions may be made to ensure that these secret keys are not allowed to be read out of the TPM (or the integrated circuit within which the TPM resides) in the clear (e.g., in unencrypted form). Through the use of these keys and/or keys derived from these keys, the TPM may securely store information outside of the TPM (or the integrated circuit within which the TPM resides). For example, the cryptographic processor(s) 330 may use these keys to encrypt and/or authenticate any data that is stored in an external memory such as the flash memory 306.

Various types of information may be stored in the flash memory 306 to support the secure code update capability of the TPM 302. A description of one embodiment of such information follows.

A secure code structure 336 may contain encrypted executable code. This code may include, for example, any modified and/or new functions for the TPM 302.

A secure code descriptor structure 338 may describe the secure code information stored in the flash memory 306. For example, the secure code descriptor may describe the size of the secure code information and include keys that are used for decrypting or verifying information to be stored in the flash memory 306. In some embodiments the secure code descriptor structure 338 may be encrypted and/or authenticated using functions and/or key(s) stored in the OTP memory 332.

A function table 340 may contain a pointer to (e.g., an address of) every function that resides in on-chip ROM 310 and external flash 306. The function table 340 may be updated each time new secure code is written to the flash memory 306. In some embodiments the flash function table 340 may be both encrypted and authenticated by keys that are stored in the OTP memory 332. A flash function table 340 may be defined even when there is no code stored in the flash. In some embodiments the function table structure 340 may be read by the processor 308 via the instruction cache controller 326.

A read-only data ("rodata") segment 342 contains data for functions that are stored in the flash memory 306. For example, the flash rodata table 342 may contain constants used by functions such as cryptographic routines, self-test routines, and functions with switches. The flash rodata segment 342 may be updated each time new secure code information is stored in the flash memory 306. The rodata segment 342 may be encrypted and authenticated. In some embodiments the rodata structure 342 may be read by the processor 308 via the instruction cache controller 326.

In some embodiments the flash function table 340, rodata 342, and secure code 336 may be authenticated in, for example, fixed-sized blocks (e.g., 256 bytes) using HMAC-SHA1. For each encrypted block, the resulting HMAC may be stored in a secure code authentication region 344.

In some embodiments the flash 306 includes data used by the he system after the secure code has been loaded and the system is operating in a secure mode. For example, the flash 306 may store keys and data 356 and non-volatile RAM data for a TPM.

In some embodiments the flash memory 306 is hard partitioned. For example, a hard partition may be defined for the flash memory 306 between code used by the TPM (e.g., the secure code information discussed above) and code used by one or more other devices, components or processes. In this case, the flash may contain components 336, 338, 340, 342 and 344 used for secure code load operations. In addition, the flash may contain other firmware 346 and a flash directory 348 that is used by the other devices/components/processes. For example, the flash memory may store code and data 346 that is used by another processing component 222 (e.g., a local area network device) as shown in FIG. 2.

With the above component configuration in mind, a brief overview of one embodiment of data flow in the system of FIG. 3 will now be provided. In particular, information flow relating to writes to and reads from the flash memory 306 and reads from the instruction ROM 310 will be discussed.

The processor 302 writes data to flash memory 306 through the external interface module ("EIM") 322. For example, a command may be invoked to move information from the LPC bus 324 to the data buffer 318. The cryptographic processor (s) 330 may then verify a signature over the received information. Next, the cryptographic processor(s) 330 may encrypt the information and generate an authentication digest for the information. Finally, the encrypted information is sent to the flash memory 306 via the external interface module 322 and the flash controller 304.

In some embodiments the TPM may access the external flash through three separate mechanisms. These mechanisms may be used to perform general data fetches, instruction fetches, and function table and rodata fetches.

The processor 308 (e.g., TPM firmware executing on the processor) reads data stored in the external flash through the external interface module 322 that is attached to the data bus 316. For example, TPM non-volatile data stored in a TPM non-volatile RAM portion 358 of the flash memory 306 may be read by the processor 308 in this manner. This information may be requested, for example, via a load-word ("lw") instruction. The external interface module 322 interfaces with the flash controller 304 to retrieve the requested data.

The processor accesses executable code through the instruction multiplexer 312. The processor 308 issues an instruction fetch over the instruction bus 314. The instruction multiplexer 312 determines whether the requested code is stored in the instruction ROM 310 or the flash memory 306. After the instruction multiplexer 312 retrieves the code from the appropriate data memory, the instruction multiplexer 312 returns the code to the processor 308 via the instruction bus 314.

The processor (e.g., the TPM firmware) issues reads for the flash function table or the flash rodata segment on the data bus 316. These reads are serviced by the instruction multiplexer 312. After decoding a function table or rodata segment read access, the instruction multiplexer 312 may issue a request to the instruction cache controller 326 to retrieve the requested information. The instruction multiplexer 312 then returns the information to the processor via the data bus 316.

There are two consumers of the instruction cache controller 326: a processor instruction fetch and a flash function table (or rodata) access. If the instruction cache controller 326 is busy responding to a cache miss, the other request may be registered by the instruction multiplexer 312 until the original cache miss has been serviced. When the instruction multiplexer 312 simultaneously receives a flash instruction fetch and a flash function table access, the processor 308 may be stalled until both requests have been serviced. An instruction ROM fetch and flash function table request may be serviced simultaneously by the instruction multiplexer 312.

In some embodiments, when the flash function table or flash rodata is accessed the returning data must be authenticated before it is used. Otherwise, an attacker could modify the function pointers or constants stored in the flash memory 306 to change the operation of the processor 308. However, it is desirable to make the access latency of the function pointer table as small as possible so that firmware performance is not impacted. Accordingly, in some embodiments the instruction cache controller 326 performs the authentication operations and the instruction cache 328 may provide low-latency access on a cache hit.

The flash controller 304 may receive requests from the instruction cache controller 326, the external interface module 322 and, as illustrated in FIG. 2, other processing components 222 (e.g., a NIC controller). In some embodiments these components arbitrate for access to the flash controller 304.

If the instruction cache controller 326 has the grant of the flash controller 304 when the processor 308 (via the external interface module 322) requests arbitration from the flash controller 304, the TPM firmware may enter failure mode. Likewise, if the external interface module 322 has the grant when the instruction cache controller 326 requests the grant, the instruction cache controller 326 may assert the error signal to the instruction multiplexer 312.

In some embodiments provisions may be made to avoid a deadlock scenario that may otherwise occur when the instruction cache controller 326 is prevented from requesting arbitration because the external interface module 322 has been given the flash grant. For example, the designer may ensure that any functions that access the external interface module 322 are only placed in the on-chip ROM 310. Since these functions are not placed in the flash function table 340, the likelihood of simultaneous instruction cache controller and external interface module accesses to the flash controller may be reduced.

To support the access to the flash memory 306, the processor 308 may be configured to stall when there is an instruction cache miss during a flash function table (or rodata) read. The processor 308 stalls until the data is available. Also, on a flash instruction miss, the processor 308 may stall until the instruction is available.

To support the above accesses to the data bus 316, the processor 308 may be configured to stall when there are multi-cycle requests on the data bus 316. In some embodiments all data bus accesses take just one cycle with the exception of the flash function table read.

The memory map of TPM 302 may be configured to support the secure code components discussed herein. For example, in some embodiments unique address ranges are assigned for the OTP memory 332, the cryptographic processor(s) 330, the external interface module 322, the instruction cache controller 326, the instruction multiplexer 312, the instruction ROM 310, the flash memory 306 and secure assurance logic (not shown).

Figure 4:
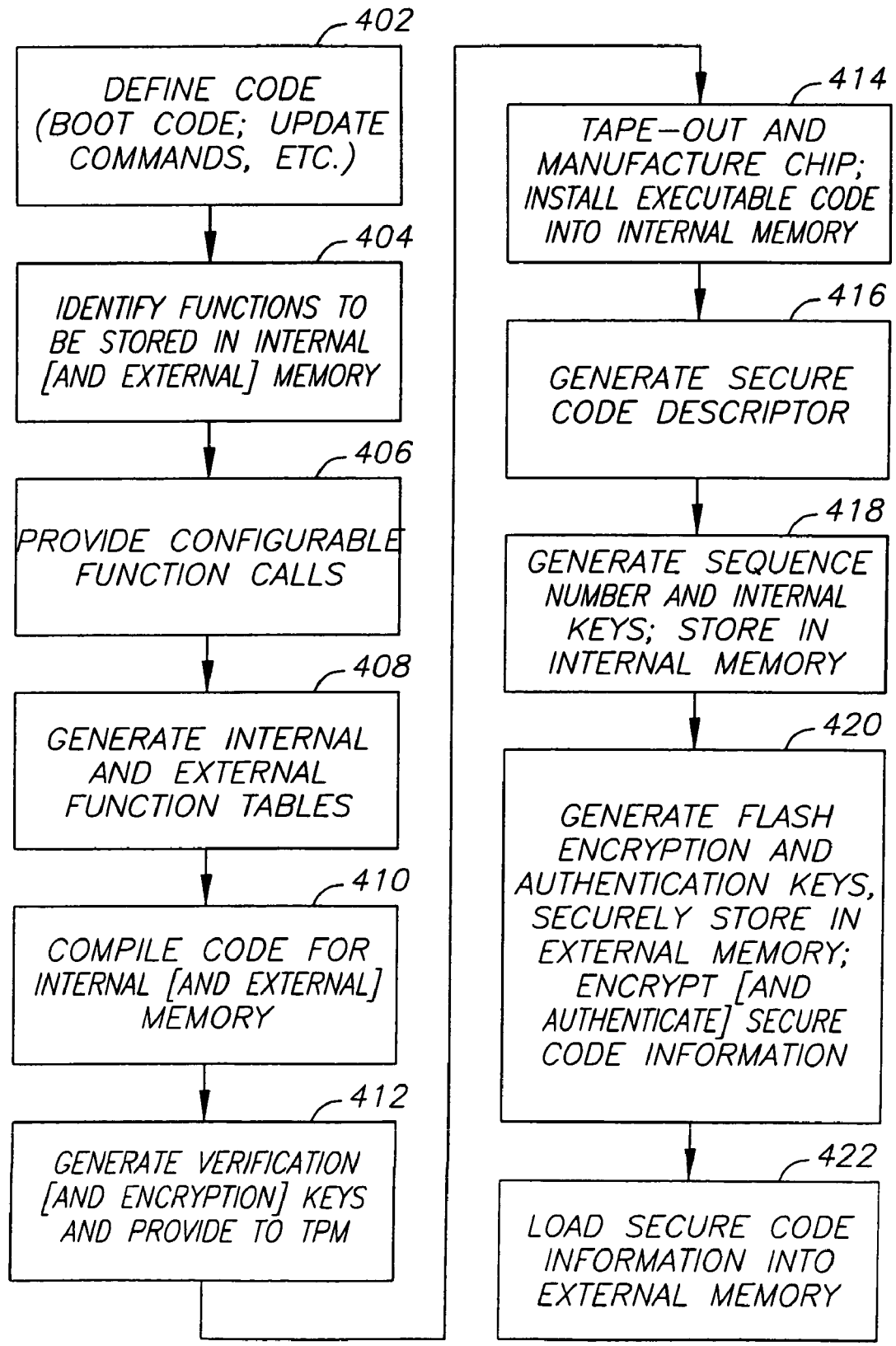
FIG. 4 is a flow chart of one embodiment of manufacturing-related operations that may be performed in accordance with the invention.
Figure 5:
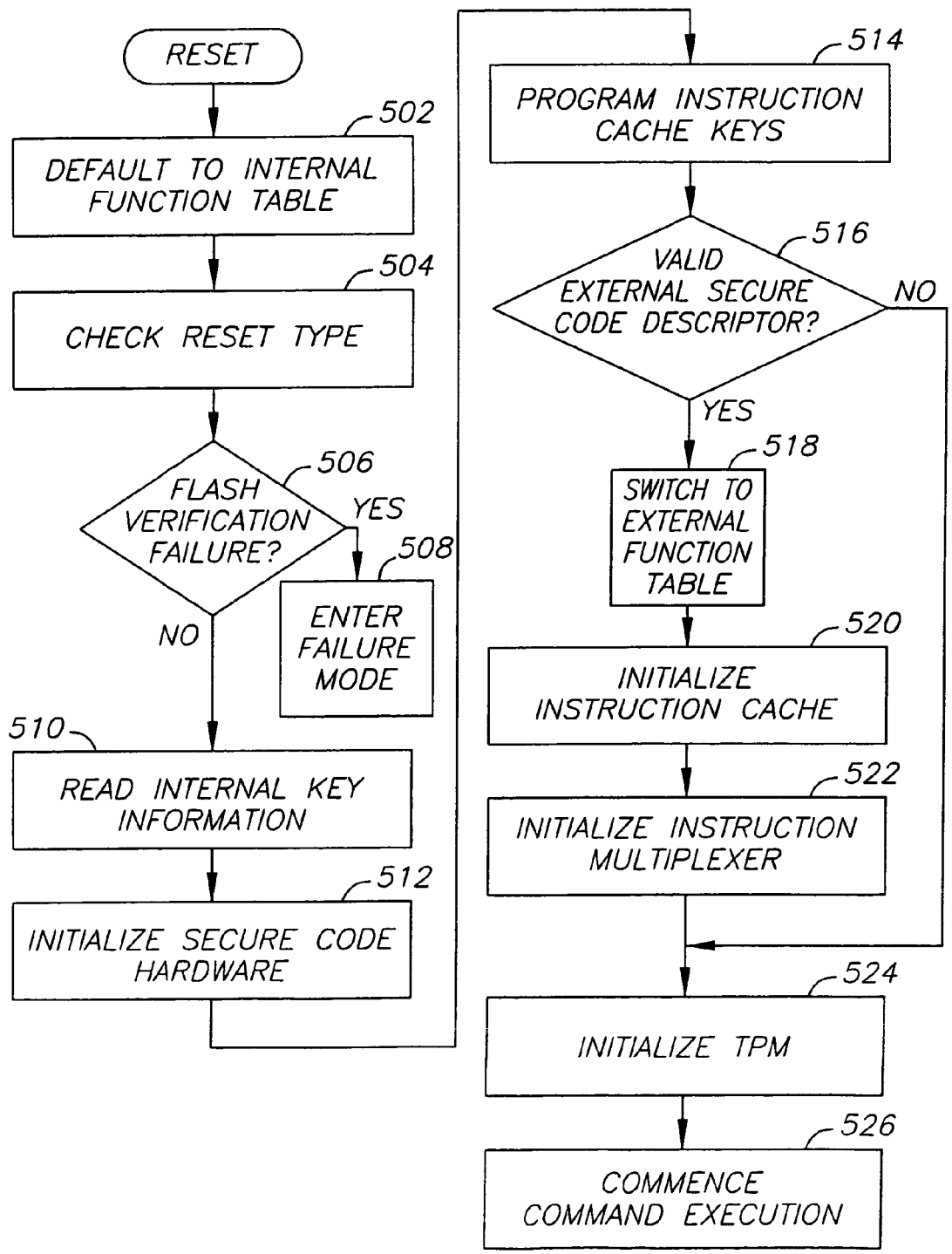
FIG. 5 is a flow chart of one embodiment of boot-related operations that may be performed in accordance with the invention.
Figure 6:
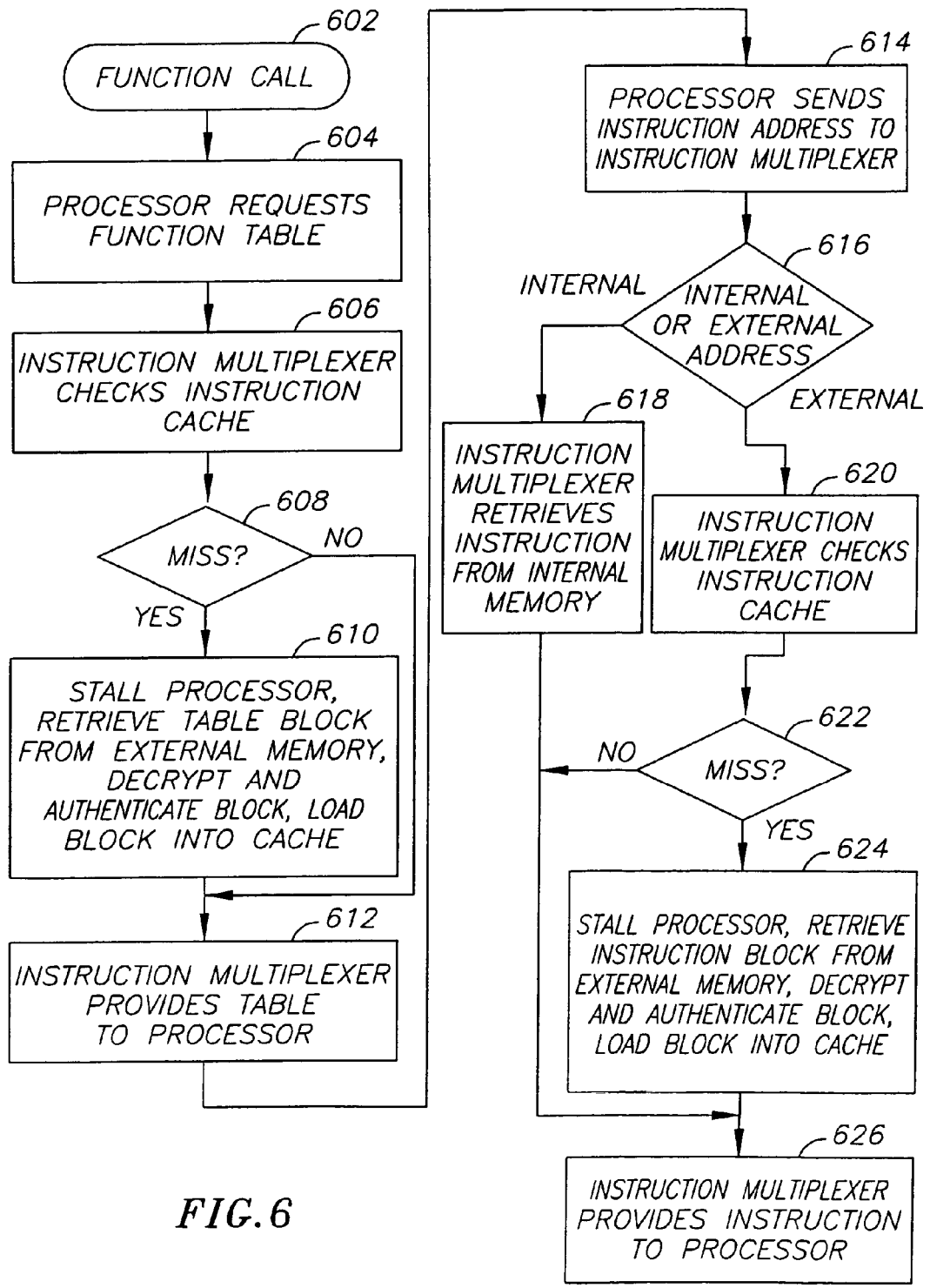
FIG. 6 is a flow chart of one embodiment of instruction-related operations that may be performed in accordance with the invention.

Referring now to the flowcharts of FIGS. 4-8, various examples of operations that may be performed by one embodiment of a system constructed in accordance with the invention will be discussed in more detail. FIG. 4 relates to operations that may be performed when the system is manufactured. FIG. 5 relates to operations that may be performed when the system boots up. FIG. 6 relates to data and instruction access operations the system may perform. FIGS. 7 and 8 relate to operations that may be performed when new and/or modified functions are loaded into an external memory.

In FIG. 4, as represented by block 402, initially a code designer defines the original program code for the TPM. This code may include, in addition to typical TPM code, code that supports the secure code load mechanism and associated secure code components. For example, the boot code for the TPM may include provisions as discussed below that support the secure code load mechanism. In addition, the program code for the TPM may include function calls that are used to securely load new and/or modified code. The secure code scheme may be designed so that a designer is largely unaffected when coding TPM commands. For example, in some embodiments only boot and command switch firmware may be modified or added to support secure code load. Also at this stage, security routines that are to be stored in the OTP memory may be defined.

Once the code has been written, the code is processed by a compiler to generate the machine code that is to be loaded into data memory. Several secure code load specific operations are discussed in conjunction with blocks 404-410. In some embodiments, several of these operations may be implemented through the use of scripts that are provided as extension of the compiler. Hence, the operations described below may be partially or completely automated. Alternatively, as discussed below, in some embodiments a designer may have control over some of these operations.

As represented by block 404 the designer determines which functions defined in the program code will be stored in internal memory (e.g., on-chip ROM) and will, consequently, be entered in the on-chip function table. Here, the designer may generate a file (e.g., romOnlyFunctions.txt) that specifies whether a function only resides in ROM.

In addition, the designer may generate a file (e.g., secureCodeCommands.txt) that contains a list of commands that are called during secure code load. The designer may recursively parse the call tree for these commands. All secure code load functions that are called and are not listed in romOnlyFunctions.txt are placed in the on-chip function table.

The designer may then determine the function partitioning between instruction ROM and flash memory. For example, the designer may generate a file (flashFunctions.txt) that specifies which functions reside in external memory (e.g., flash memory). After applying flashFunctions.txt, the designer may calculate how much code is to be placed in flash memory. If the code does not fit in ROM, the designer may find infrequently used functions and allocate them to flash memory. Functions specified in romOnlyFunctions.txt are not moved to flash. The designer may thus cause two assembly files to be generated: one for the internal ROM and one for flash memory.

The designer also may determine the order of the functions to be stored in on-chip ROM. In some embodiments functions are ordered to maximize locality.

The designer also may determine the order of the functions to be stored in flash memory, if applicable. Functions in the on-chip function table are listed in the same order as in the flash function table. Again, functions may be ordered to maximize locality.

As represented by block 406, the program code may be defined and/or modified to support function calls to code stored in either the internal memory or the external memory. This may involve, for example, modifying function calls for functions that are not contained in romOnlyFunctions.txt.

In some embodiments the compiler initially compiles the program code and determines which functions are placed in the internal memory and, if applicable, external memory. In some embodiments, to enable a function that is stored in internal memory to be replaced with a function stored in external memory, function calls may be expanded to enable a relatively simple code swap. Various code implementations may be used to provide this functionality. In general, the code implementation depends on the specific processor in the system. One example of such an expansion for an Open RISC processor follows:

Original jump-and-link function call:

jal F_function

New load-word and jump-and-link function call:

lw r1, TABLE_OFST(r28)

jalr r1

Here, a register (r28) contains the base address of the function table. The base address will either point to the internal memory or to the external memory. The TPM will first load the function pointer from the function table, and will then jump-and-link to the function address in register r1.

In some embodiments there is a unique table offset ("TABLE_OFST") for each function that resides in a function table. For functions that reside in both the internal and external function tables, the TABLE_OFST is the same. Register r28 (or any other register or memory location may be used for this purpose) may be reserved during compilation. The firmware will initialize this register to either point to the internal or external function table.

The use of code expansion as described above may have a relatively minor impact on the performance of the system. In general, jump-and-link instructions make up a relatively small amount of the code. In a secure-code implementation, code size may increase by this amount due to the function pointer table access. In addition, there may an increase in latency if the instruction cache is not used to authenticate and decrypt the flash function pointer table and flash rodata access.

As represented by block 408, the internal and external function tables may be generated by, for example, calculating function pointers for each function. This procedure is discussed in more detail below.

The internal function table may be used before secure code has been loaded into flash or when a new secure code image is being loaded. When the internal function table is used, all called functions are contained in on-chip ROM. In some embodiments the internal function table includes boot routines, flash access functions, self-test functions, authorization routines, and field upgrade commands. In some embodiments this function table may only be generated during a full-layer or metal tape-out.

The external function table may be used once secure code has been loaded into external flash. The TPM uses the external function table to determine whether a given function resides in the on-chip ROM or the external flash memory. Original functions that have been modified may reside in both the on-chip and external flash function tables. In this case, the flash function table may indicate that the newer, modified function stored in external memory should be used. Even if all of the code initially resides in on-chip ROM, the flash function table may be generated so that functions may be replaced in future releases.

At block 410 the compiler completes the compilation of the program code (including the functions) to generate the final machine code. In the event some functions are to be stored in the external memory, machine code may be generated for both the internal memory and the external memory as discussed above.

As represented by block 412, at some point during the manufacturing process a verification key (and optionally an encryption key) may be generated for the code update process. For example, in some embodiments cryptographic processor(s) in a secure environment (e.g., a FIPS level 3 environment such as a hardware security module) generates public and private key pair(s) to be used with all TPM devices that the secure environment supports. The secure environment then provides the public key(s) to the manufacturer so that the manufacturer may install the public keys in each TPM. The private keys, on the other hand, are protected from disclosure. For example, the signing (and encryption) keys may be stored in the hardware security module.

As represented by block 414, the manufacturer tapes-out the chip and incorporates the internal secure code information into the TPM device (e.g., chip). The internal secure code information may include, for example, the internal function table, the internal secure code, the internal rodata and the public verification (and optionally decryption) keys. In some embodiments the internal secure code information may be incorporated into the internal ROM during a full tape-out or a metal tape-out of the chip. In other embodiments the code may be loaded into a chip after it is manufactured.

As represented by block 416, the manufacturer also generates a flash secure code descriptor. The flash secure code descriptor may be used to describe the code stored in the external flash. For example, the secure code descriptor may contain information that may be required by the TPM to correctly initialize secure code hardware. In addition, the secure code descriptor may be used to hold verification (and optionally decryption) keys.

The following describes several examples of fields that may be defined for one embodiment of a secure code descriptor. One field may indicate that secure code firmware stored in flash is valid. This field may be securely set in flash by the upgrade complete sub-command as discussed below. This field may be securely cleared in flash by the upgrade start sub-command as discussed below. This field may be set by the TPM.

Other fields may store, for example, the version of the upgrade information, the most-significant 4 bytes of the SHA1 hash over the code stored in external flash, the version number defined in the trusted computing platform alliance ("TCPA") main specification, date information, the text size (e.g., the size in bytes of the flash rodata and flash function table), the image size (e.g., the size in bytes of the flash rodata, flash function table, and flash firmware) and the heap pointer address.

As will be discussed in more detail below, the secure code descriptor also may include information related to one or more keys that may be used to verify received information that is to be loaded into the flash memory. For example, one field may contain the version of the signature key and another field may contain, for example, a 2048 bit RSA key that is used to verify the received information.

When a chip implementing a TPM is first soldered to a motherboard by an OEM, the secure code and associated information may not be initialized in the external flash. In this state, a TPM may simply execute functions that are required to boot, to load the secure code information into flash, or to test the TPM during manufacturing.

As represented by block 418, at some point during the manufacturing process (e.g., during a test or boot procedure) the TPM may generate an internal sequence number and internal keys that may be unique to that specific TPM chip.

The sequence number may be used to track the number of updates to the flash memory. For example, every time new secure code information is written to flash memory, the sequence number in an internal memory may be incremented and stored in the flash memory.

The internal keys (or keys based on these keys) may be used, for example, to encrypt and perform authentication operations on information that is stored in the flash memory. For example, the keys stored in the OTP memory may be used to encrypt other keys so that these other keys may be securely stored in external memory.

The key information may be securely stored within a security boundary associated with the TPM. For example, the TPM may be configured to only store this information in the clear in an on-chip memory. In this case, the TPM would never send this information outside of the chip in the clear. Accordingly, a key or set of keys that is stored in the OTP memory may be used to encrypt other keys (that may be used for the encryption, decryption, verification and authentication operations) so that those other keys may be securely stored in the flash memory.

The operations represented by blocks 420 and 422 may be performed in the event there is secure code information to be loaded into the flash memory. At block 420 the TPM (e.g., cryptographic processor(s) 330 in FIG. 3) generates encryption and authentication keys that may be used to encrypt and authenticate information stored in the flash memory. These keys may be securely stored in the flash memory (e.g., in the TPM keys/data section 356) by encrypting the keys using the internal keys discussed above.

These encryption and authentication keys (or related keys) also may be accessed by the instruction cache controller (e.g., the cryptographic processor(s) 334 in FIG. 3) for operations that are discussed below. The instruction cache controller uses these keys to decrypt and authenticate secure code information that it retrieves from the flash memory.

The TPM (e.g., cryptographic processor(s) 330) uses the encryption and authentication keys to encrypt and/or authenticate the flash secure code information. This information may include, for example, the flash secure code descriptor (including the public verification and encryption keys), the flash function table, the flash read-only data, and the compiled flash secure code.

As represented by block 422, the encrypted flash secure code information may then be loaded into the flash memory. During manufacturing, owner authorization may not be required to execute the secure code load commands. This allows an OEM to load the secure code information into flash memory without creating the TPM device keys (e.g., EK and SRK). Once the secure code descriptor disables unauthorized field upgrades (e.g., via a corresponding field entry), any subsequent field upgrade commands may require owner authorization. After the secure code information has been successfully loaded to flash memory, the TPM may be temporarily deactivated until the next system reboot.

FIG. 5 illustrates one embodiment of boot operations that may be performed in a TPM that has been deployed in the field. As will be discussed in more detail below, a variety of conditions may cause the TPM to be reset.

As represented by block 502, after a reset the system defaults to executing functions as defined in the internal function table. For example, register 28 (r28) may be set to point to the base address of the on-chip function pointer table.

As represented by block 504, the system then determines the cause of the reset. For example, when an error caused the reset, the system may store the type of error in a status register before initiating the reset. As a result, when the system commences the boot operation, the system may check the appropriate status registers to determine what caused the reset. In some embodiments reset types may include, for example, a power-on reset ("POR"), a reset initiated via the LPC bus, a reset initiated by the security assurance logic, a reset initiated as a result of an instruction cache authentication failure (e.g., a failure that occurs when verifying data read from the flash).

As represented by blocks 506 and 508, in some embodiments a flash verification failure reset may cause the system to enter a failure mode. In this case, when the system tried to read code stored in the flash memory, the authentication check over the code may have failed. Since the code in the flash memory cannot be trusted the system may continue to only execute code according to the internal function table (e.g., execute code in the internal ROM).

In some embodiments similar steps may be taken when the reset was initiated by the security assurance logic. Again, a security assurance logic failure may indicate that the integrity of the system has been compromised. Accordingly, the system may be set to only execute the original set of functions that were loaded into the internal memory.

Alternatively, if the reset is caused by other types of resets the system may perform the standard boot procedure. For example, some resets such as a power-on reset or an LPC reset may not have been caused by a condition that compromised the integrity of the system.

As represented by block 510, the system may configure certain information relating to the internal keys (e.g., those stored in the OTP memory). For example, the system may read the OTP memory and initialize any corresponding data structures in the data buffer. In addition, when the OTP has been programmed (e.g., the system is in a normal operating mode) the system may enable various operations (e.g., frequency and/or reset monitoring) relating to the security assurance logic.

As represented by block 512, during the normal boot sequence the system may initialize the secure code hardware (e.g., data structures and data buffers). Here the system may set a secure code flag to FALSE. In this mode, only commands that are used to load secure code are allowed. This may be enforced in the command switch. In some embodiments any functions that initialize secure code hardware may not reside in flash memory since they may be used to change the pointer to the function table. The system also may verify that the type, size, and page size of the flash memory are supported by the system.

As represented by block 514, the system also may initialize keys for the instruction cache. For example, in an embodiment that supports 3DES and HMAC the system may initialize a 3DES key for decryption operations and an HMAC-SHA1 key for authentication operations. In some embodiments these keys may be subsequently encrypted using an internal key and stored in the flash memory (e.g., TPM keys/data 356 in FIG. 3). It should be appreciated that these operations are provided as examples only and that the system may use other cryptographic algorithms and perform other operations.

As represented by block 516, the system determines whether any new and/or modified functions have been loaded into the flash memory. In some embodiments this is accomplished by checking to see whether there is a valid secure code descriptor stored in the flash memory. If the flash access fails due to a flash controller reset, the system may retry the flash access.

If new and/or modified functions have not been loaded into the flash memory (a "NO" at block 516), the system continues to use the on-chip function table (e.g., stored in the on-chip ROM) to determine where to retrieve program code. In this case, all functions may be retrieved from the on-chip ROM. The branch of the process will then proceed to block 524.

As represented by block 518, if new functions have been loaded into the flash memory (e.g., the flash memory contains a valid secure code descriptor), the system may be configured to use the off-chip (flash) function table to determine where to retrieve program code. Initially, the system decrypts and authenticates the secure code descriptor using, for example, the 3DES and HMAC-SHA1 keys. In some embodiments the secure code descriptor may be double-buffered as discussed herein. If the authentication is not successful, the system will set appropriate field in the secure code descriptor to indicate that the descriptor is invalid.

If the authentication is successful the system copies the secure code descriptor to the data buffer. The system then checks the field that indicates whether the secure code descriptor is valid. In addition, the system checks the field that indicates that the secure code stored in the flash memory is valid.

If both of these are valid, the system may switch to the external function table. For example, register 28 may be set to point to the base address of the flash function table.

In this case, the new and/or modified functions will be retrieved from the flash memory and any original and unmodified functions will be retrieved from the on-chip ROM. The system may then set the secure code flag to TRUE. In this mode, all TPM commands may be executed in accordance with the TPM specification.

As represented by block 520, the system initializes the instruction cache. In some embodiments this may involve updating registers that hold the HMAC-SHA1 key, 3DES key, the secure code base address (the address of the first secure code block), the HMAC base address (the address of the first HMAC), the flash page size and the firmware hash from the secure code descriptor. In some embodiments these registers are only reset by a reset such as a POR or an LPC reset.

As represented by block 522, the system initializes the instruction multiplexer. In some embodiments this may involve updating the data bus address range to which the instruction multiplexer responds. For example, the instruction multiplexer may be initialized to respond to reads of the flash function table and flash rodata.

As represented by block 524, as the secure code operations complete, the system initializes the TPM. This may involve, for example, reading TPM-related data from the flash memory (e.g., TPM non-volatile ram 358 in FIG. 3) into the persistent memory.

The system also may initialize the secure buffer logic. After reset the data buffer may only be accessed when the TPM is in secure execution mode. The system thus relaxes this lock and allows the IO memory and a portion of the stack to be accessed when the TPM is not in secure execution mode.

As represented by block 526, after the boot sequence is successfully completed, the system commences normal program execution flow. In some embodiments this may involve using a command switch structure to handle command requests.

Referring now to FIG. 6, one embodiment of operations that may be performed when a function call is invoked (block 602) will be treated. As discussed above, a function call may involve a first instruction to retrieve the table offset value for the function from the function table.

Accordingly, as represented by block 604, the function call may result in a request for the function table. The processor submits this request by issuing a read (e.g., a load word operation) on the data bus.

As discussed above, the instruction multiplexer may be configured to handle read requests on the data bus for a function table. If the requested function table is stored in the internal ROM (blocks 606-610 are inapplicable to this case), the instruction multiplexer retrieves the function table and returns it to the processor via the data bus (block 612).

Alternatively, as represented by block 606, if the requested function table is stored in the external flash memory, the instruction multiplexer requests the information from the instruction cache controller. If at block 608 the function table is in the instruction cache (a cache "hit"), the instruction multiplexer returns the function table to the instruction multiplexer. The instruction multiplexer then returns the function table to the processor via the data bus (block 612).

As represented by block 610, if the function table is not in the instruction cache (a cache "miss"), the instruction multiplexer stalls the processor while the instruction cache controller retrieves the function table from the flash memory. The instruction cache controller issues a request to the flash controller to retrieve the block or blocks of data from the flash memory that contain the external function table.

Upon receipt of the requested block(s) the cryptographic processor(s) 334 use the instruction cache keys (e.g., 3DES and HMAC-SHA1 keys) to decrypt and authenticate the block(s) of data. In some embodiments, if authentication fails the TPM is reset and enters failure mode. The TPM may exit this failure mode after a reset (e.g., after an LPC reset or a POR reset)

If the authentication is successful, the instruction cache controller stores the block(s) of data in the instruction cache and the cache line is marked as valid. In addition, the instruction cache controller returns the function table to the instruction multiplexer. The instruction multiplexer then terminates the processor stall.

As represented by block 612, once the instruction multiplexer receives the table, it returns the function table to the processor via the data bus.

To initiate a function call, the processor sends the instruction address to the instruction multiplexer via the instruction bus (block 614). The instruction multiplexer either reads the internal ROM or sends a request to the instruction cache controller depending on the address associated with the function (block 616). As discussed above, this address may be obtained from the appropriate function table. Advantageously, the instruction multiplexer may access the instruction ROM or the instruction cache without any involvement from TPM firmware.

As represented by block 618, when the address is an internal address, the instruction ROM returns the requested instruction in the next cycle. In addition, in some embodiments the instruction ROM also returns security assurance logic ("SAL") bits. The SAL bits may be used to prevent an attacker from jumping the program counter of the processor without being detected.

As represented by block 620, if the requested code is stored in the external flash memory, the instruction multiplexer requests the information from the instruction cache controller. If at block 622 the code is in the instruction cache (a cache "hit"), the instruction cache controller returns the code to the instruction multiplexer in the next cycle.

In some embodiments the program counter assurance logic may be disabled when operating out of the instruction cache. For example, the SAL bits may be set high when returning data from the instruction cache.

As represented by block 624, if the code is not in the instruction cache (a cache "miss"), the instruction multiplexer stalls the processor while the instruction cache controller retrieves the code from the flash memory. The instruction cache controller issues a request to the flash controller to retrieve the block or blocks of data from the flash memory that contain the external code.

Upon receipt of the requested block(s) the cryptographic processor(s) 334 use the instruction cache keys (e.g., 3DES and HMAC-SHA1 keys) to decrypt and authenticate the block(s) of data. If the authentication is successful, the instruction cache controller stores the block(s) of data in the instruction cache and the cache line is marked as valid. The instruction cache controller returns the requested code to the instruction multiplexer and the instruction multiplexer terminates the processor stall.

In some embodiments if authentication fails, the instruction cache may raise an error signal. When this signal is raised, the TPM is reset. After reset, the boot routine generates an error response for any interrupted command and the TPM enters failure mode. The exception handler places the TPM in a failure mode until the next reboot. In this mode, secure code stored in external flash may not be accessed.

As represented by block 626, after the instruction multiplexer receives the requested code, the instruction multiplexer returns the code to the processor via the instruction bus. The processor is thus able to execute the instruction associated with the appropriate (e.g., original, modified or new) function.

FIG. 9 illustrates one embodiment of how data may be decrypted and authenticated in the system. As discussed herein, the secure code may be encrypted and an authentication digest over the secure code may be generated before the secure code is stored in external memory. The block 902 on the left side of FIG. 9 represents the secure code and authentication information that is stored in the flash memory. The block 904 on the right side of FIG. 9 illustrates the various parameters that are used to decrypt and authenticate the secure code.

The secure code 906 and the code authentication 908 may be stored as represented in FIG. 3 in the secure code location 336 and in the secure code authentication location 344, respectively, in the external flash 306. In some embodiments the secure code 906 comprises a set of secure code blocks (e.g., blocks 0, 1, 2, etc.) and the code authentication code comprises a set of corresponding code authentication blocks (e.g., blocks 0, 1, 2, etc.). As shown in FIG. 9, the secure code blocks and their corresponding HMACs each may be stored contiguously in separate memory blocks in memory.

In the example of FIG. 9 an initialization vector ("IV") 926 begins 8 bytes before the start of the secure code block. In some embodiments the IV for the first code block is stored in the flash memory. This IV may be generated by a random number generator (not shown) that may be one of the secure code components. The IV for subsequent code blocks may be, for example, the last 8 bytes of the previous encrypted block. This association is represented by the line 912 in FIG. 9.

In some embodiments the decryption algorithm (e.g., 3DES) is performed over the fields represented by line 920, namely, the 3DES IV 926 and the secure code 928.

In some embodiments the authentication (e.g., HMAC-SHA1) may be performed over the fields represented by line 918: {a 4 byte firmwareHash 922 | a 4 byte logical address 924 | an 8 byte IV 926 | a 256 byte secure code block 928}. The line 914 represents that the secure code from the memory 902 is provided to the cryptographic operations. The firmware hash field 922 from the secure code descriptor prevents an attacker from mixing secure code blocks from different secure code load revisions. The 4 byte logical address 924 points to the base address of the 256 byte block and may be used to determine whether an attacker has moved any of the code blocks in the flash memory.

As represented by line 916, the authentication generated as a result of the HMAC-SHA1 operation over the fields 918 is verified against the code authentication 908 for the corresponding 256 byte block stored in the flash memory. After successful authentication, the cache line may be marked as valid and the data may be returned to the instruction multiplexer block. On a failure, the cache line may be marked as invalid and the instruction cache controller may raise an error signal to the instruction multiplexer.

Referring now to FIGS. 7 and 8, one embodiment of operations that may be performed to update secure code will be discussed. FIG. 7 relates to operations that may be performed by, for example, a manufacturer to create and deliver new code to a target system (e.g., a TPM) that has been installed in the field. FIG. 8 relates to operations that may be performed by the target system (hereafter referred to for convenience as the TPM) to install the new code.

At block 702 in FIG. 7 the manufacturer creates any new functions that are needed and modifies any functions that need to be changed. Typically, this will involve a programmer rewriting a portion of the last release of the code and/or adding new sections to that code. As the instruction ROM code and the on-chip function table stored in a masked instruction ROM may not be modified after the TPM has been taped-out (as part of the integrated circuit design and manufacturing process), any changes to the code are stored in the flash memory. However, since there may be significant overhead associated with fetching data (e.g., code) from flash memory it may be desirable to store as much of the code in on-chip ROM as possible.

To modify code, an entire function may be replaced. Depending on whether code has been previously loaded into the flash memory, modifying a function may involve creating a modified version of an original function (e.g., one stored in an internal memory) or modifying a function that was previously loaded into the flash memory. In some embodiments the only functions that cannot be replaced are secure code functions and low-level functions that access the flash.

In some embodiments the guidelines that follow may be used to more effectively update the code. First, existing global structures may not be modified. Since global structures may be used by multiple functions any change in the global structures may cause a large number of functions to be updated. Second, fields may be added to the end of volatile structures. Adding fields to the end of volatile structures may cause the heap pointer to be moved at boot. Third, memory may be allocated for adding fields to non-volatile structures.

At block 704 the compiler generates the machine code that will be stored in the external memory. Here, the compiler may determine which functions have changed or have been added. For example, a script (e.g., provided as an extension of the compiler) may compare (e.g., perform a "diff" operation) the newly compiled code with a previously saved copy of the prior version of the code. In some embodiments, the compiler may advantageously be configured to compile only the new and/or modified code.

As represented by block 706, the order of functions stored in flash memory is determined. The order of the functions may be determined, for example, by the programmer or automatically by the compiler. In some embodiments functions are ordered to maximize locality. The order of functions in the original flash function table is not changed.

As represented by block 708, the code may be defined and/or modified to support function calls to code stored in either the internal memory or the external memory. This may be accomplished as discussed herein. For example, a script may be defined that searches the code for a specific type of function call and re-rewrites that function call to support a table offset variable.

As represented by block 710 the manufacturer generates a new external function table that contains, for example, function pointers for each function. Again, this may be performed by a script (e.g., an extension of the compiler). For any original functions that have not been modified, the function table points to the internal memory. For any modified version of an original function or any new function, the flash function table points to the external memory. In the latter case, the corresponding function pointers are either modified or added in the external flash function table.

As represented by block 712, the system also generates information for a new flash secure code descriptor. As discussed above, this information may include, for example, a version number and a verification key.

As represented by block 714, the secure environment (e.g., a FIPS level 3 environment such as a hardware security module as discussed in conjunction with FIG. 1) may generate a new verification key (and optionally a new decryption key) for the TPM. Replacing the public verification key allows the manufacturer to prevent older secure code loads from replacing the latest firmware revision. In addition, if the private signing key is ever compromised, this mechanism allows the manufacturer to release a secure code image with a new signing/verification key. The new public keys may be provided to the TPM by incorporating them into the new secure code descriptor.

As represented by block 716, the compiled code may be sent to the secure environment. Here, cryptographic processor(s) in the secure environment may use the private verification key (and optionally the private encryption key) to cryptographically sign (and optionally encrypt) the secure code information. As discussed herein, the private key corresponds to a public key maintained by the TPM. The secure code information may include, for example, the secure code descriptor, the flash function table, any flash read-only data, and the compiled secure code.

In the event a new verification key has been created at block 714, the above information may still be signed using the prior version of the verification key. In this case the TPM will continue to use the prior version of the verification key until the new verification key has been successfully loaded into the TPM. In some embodiments signing is performed using the RSASSA-PKCS1-v1.5 algorithm.

As represented by block 718, after the secure environment returns the signed (and optionally encrypted) secure code information, the manufacturer sends this secure code information to the TPM. In some embodiments the process of sending code, etc. to the TPM involves invoking one or more commands. For example, the TPM field upgrade process may be divided into several parts. The first part (information request) may relate to obtaining all necessary information to do an appropriate update. Other parts (upgrade start and update) may relate to commencing and performing the transfer of the secure code information to the TPM. Another part (upgrade complete) may relate to completing the transfer.

These commands may be invoked, for example, by the manufacturer's processing system. The manufacturer's system may communicate with the TPM via an external interface 210 as shown in FIG. 2. In the illustrated embodiment, the commands are received by the host processing component 208 which sends the commands to the TPM via the bus 214 (e.g., an LPC bus). One embodiment of these commands and a process for updating code, etc., in response to these commands will be discussed in conjunction with FIG. 8.

Before the manufacturer initiates the transfer of the new code, the manufacturer's system may invoke a command to request field upgrade information that may be needed to invoke and complete the transfer. This capability may be used to obtain all relevant information about the TPM chip so that the caller can start the upgrade process. For example, this command may provide information about the chip revision, the current version of the verification key and any currently loaded firmware. Also, this command may be used to determine whether new secure code information needs to be loaded into the TPM. This command may be called under normal operating conditions and may not require owner authorization.

As represented by block 802, the TPM thus receives an upgrade information request. At block 804, the TPM returns selected information in response to this request. This information may include, for example, the version of the upgrade information structure and a firmware valid field that indicates that the firmware is valid.

In some embodiments this information may include a flag that indicates the TPM currently has an owner and an ownerAuthReq field that indicates that owner authorization is required. Owner authorization may be required when the TPM encryption key (EK) has been programmed or when the ownerAuthReq bit in the secure code descriptors is set.

The returned information also may include version numbers (e.g., relating to the TCPA main specification, the LPC bus and the signature key), the most-significant 4 bytes of the SHA1 hash over the firmware stored in external flash, and the maximum data size which may be sent to the TPM by the upgrade update and upgrade complete commands.

After the manufacturer receives the necessary information to initiate the transfer of the secure code information, it sends an upgrade start command to the TPM. This command starts the upgrade process by providing a new secure code descriptor to the TPM. Owner authorization may be required if the EK has been generated.

The upgrade start command may include, for example, the size of the secure code descriptor, the secure code descriptor and a signature (e.g., a RSASSA-PKCS1-v1.5 2048 b signature) calculated over the secure code descriptor and the authorization digest for returned parameters.

As represented by block 806 once the TPM receives this command, it may verify various aspects of the command. For example, the TPM may verify that authorization is required when the EK has been generated. If authorization is required, the TPM may use the authorization protocol to verify that the command was sent by the owner.

In some embodiments the TPM may verify a signature over any received data (e.g., the new functions and function table). By using the cryptographic public key obtained from a trusted source as discussed above, the system may be assured that the data came from the trusted source (e.g., the holder of the corresponding private key) and that the data has not been compromised.

Initially, the TPM verifies the signature of the new secure code descriptor (block 808). If a valid secure code descriptor was read from the flash memory at boot the TPM uses the public verification key stored in flash memory. If a valid secure code descriptor was not read from the flash memory at boot the TPM uses the public verification key stored in the internal ROM.

As represented by block 810 the TPM temporarily deactivates the TPM. The system may then ensure that the device only executes code from the internal memory. For example, the system may set the processor register r28 to point to the on-chip function pointer table.

The system may then update and save the old secure code descriptor in preparation for writing the new secure code descriptor to the flash memory. The system sets the volatile secureCode field to false. The system also copies the new secure code descriptor to non-volatile memory. To update the old secure code descriptor, the system may clear the firmwareLoaded field, generate a new IV and encrypt and authenticate the descriptor with the flash 3DES and HMAC-SHA1 keys. The system then writes the old secure code descriptor back to the flash memory.

The secure code descriptor may be double-buffered in the external flash. This may guarantee that the flash secure code descriptor is not corrupted on a failing write. One embodiment of such double-buffering is discussed below.

As represented by block 812, the TPM opens a thread that calculates a SHA-1 digest over the received secure code information. Accordingly, the TPM initially incorporates the new secure code descriptor into the digest. The TPM also may clear the counter that keeps track of the number of 256 bytes secure code blocks.

After the manufacturer receives an indication from the TPM acknowledging the start command, the manufacturer sends one or more upgrade update commands to the TPM. This command writes secure code into the external flash. In some embodiments this command may only be called after an upgrade start command or a previous upgrade update command. Owner authorization may not be required. However, owner authorization may be used to establish a transport session. Transport sessions may be used to encrypt the secure code information. In some embodiments, to keep the amount of data sent with each command relatively small, multiple upgrade update commands may be used to transfer the secure code information.

The upgrade update command may include, for example, the total number of input bytes, the size of the secure code information, the maximum size from the upgrade information request, the secure code information (e.g., secure code, rodata, etc.), the authorization handle used for owner authorization, and the authorization digest for the returned parameters.

As represented by block 814, once the TPM receives this command, it may verify various information and/or conditions associated with the command. For, example, the TPM may verify that the previous command was an upgrade start or upgrade update command and that the previous command completed successfully. In addition, if authorization is required the TPM may use the authorization protocol to verify that the command was sent by the owner. The TPM also may verify that the number of bytes received is not greater than that specified in the image size field of the new secure code descriptor (block 816).

In some embodiments the secure code information may be encrypted as it is loaded into the TPM. Encryption may be desirable to prevent an attacker from gaining knowledge of the firmware functionality. TPM 1.2 transport sessions may be used to encrypt the code as it is transmitted on an internal bus (e.g., an LPC bus). Additionally, software applications could encrypt the secure code when it is delivered to a user's personal computer (PC). In these embodiments, the TPM may decrypt the received secure code information before it is processed for storage into the flash memory. Here, the TPM may use keys that were provided by an entity that created the keys used for encryption. These keys may be securely stored by the TPM, for example, as discussed herein.

At block 818, the TPM incorporates the blocks of received data into a digest of the existing SHA-1 thread. In some embodiments only integral numbers of complete blocks (e.g., 256 bytes each) may be processed. In this case the secure code size should be modulo 256 bytes.

In some embodiments the TPM may perform encryption and/or authentication operations on any information (e.g., secure code, rodata, function table, etc.) that is to be stored in the flash memory. In this way, the information may be protected (e.g., encrypted) when it is stored external to the chip. In addition, through the use of authentication, the TPM may verify that the information it retrieves from external memory has not been tampered with or replaced by unauthorized persons or programs.

Accordingly, as represented by block 820 the TPM may encrypt each secure code block (e.g., 256 bytes) and generate an authentication digest for each secure code block using the flash 3DES and HMAC-SHA1 keys, respectively. As discussed above, FIG. 9 illustrates one embodiment of how each block may be encrypted and authenticated. For the first block, the IV may be generated by the random number generator. For subsequent blocks, the IV may be the last 8 bytes of the previous encrypted block.

As represented by block 822, the TPM writes each encrypted block and its corresponding authorization digest (e.g., 16 bytes) to the flash memory. The TPM may then increment a counter that keeps track of the number of secure code blocks. In the event subsequent upgrade update commands are invoked, the TPM may repeat the operations associated with blocks 814-822

To complete the upgrade process the manufacturer sends an update complete command. This command causes the TPM to write secure code into the external flash and verify the SHA1 digest that was calculated over the new secure code descriptor and the secure code blocks against the signature field. Upon successful verification, the new secure code descriptor may be securely written to flash. Owner authorization may not be required. However, owner authorization may be used to establish a transport session which may be used to encrypt the secure code information.

The upgrade complete command may include, for example, the total number of input bytes, the size of the secure code information, the maximum size from the upgrade information request, the secure code information (e.g., secure code, rodata, etc.), a signature (e.g., RSASSA-PKCS1-v1.5 2048 bit) over the transmitted secure code information, the authorization handle used for owner authorization, and the authorization digest for the returned parameters.

As represented by block 824, once the TPM receives this command it may verify various aspects of the command. For example, the TPM may perform operations similar to those discussed above in conjunction with blocks 814 and 816.

If the update complete command includes secure code information, the TPM may perform operations similar to those discussed above in conjunction with blocks 818-822. For example, the TPM may incorporate the received blocks into the verification digest, perform encryption and authentication operations on the blocks, store the encrypted code blocks and authentication digests into the flash memory and increment the counter that keeps track of the number of secure code blocks.

As represented by block 826, the TPM completes the SHA-1 digest. The TPM verifies the signature by calculating the signature over the SHA-1 digest.

At block 828, upon successful verification of the new secure code information, the TPM writes the new secure code descriptor to the flash memory. Here, the TPM may set the firmware loaded and descriptor valid fields of the new secure code descriptor. The TPM may then clear the firmware loaded field of the old secure code descriptor stored in flash. As discussed herein, the secure code descriptor may encrypt the descriptor and/or calculate an authentication digest for the descriptor before it is stored in the flash memory.

The secure code descriptor may be double-buffered in the external flash. This may guarantee that the flash secure code descriptor is not corrupted on a failing write. This also may prevent the descriptor from being corrupted if power is removed while the descriptor is being updated. A description of one embodiment of the double-buffering scheme follows.

Upon boot, two descriptors are authenticated using the HMAC-SHA1 flash key. If both authentications are successful, the descriptor with the highest sequence number may be copied to the current descriptor in volatile memory.

The upgrade start command updates the current descriptor in flash memory. Whenever a descriptor in flash is modified, the older descriptor in the flash is overwritten. In case the power is removed when the descriptor is being updated in flash, the current descriptor is valid and may indicate that valid firmware is loaded in flash.

The upgrade complete command writes a new descriptor to the flash memory. The current descriptor modified during the upgrade start command is not overwritten. The older descriptor is overwritten. If power is removed, the current descriptor is still valid and indicates there is not valid firmware loaded in flash.

Referring again to FIG. 8, at block 830 the TPM will increment the internal sequence number and load it into the flash memory. After the upgrade operation is complete, the system will be reset (block 832) so that during the next boot procedure the new function table and secure code descriptor information will be used for subsequent operations.

Figure 10:
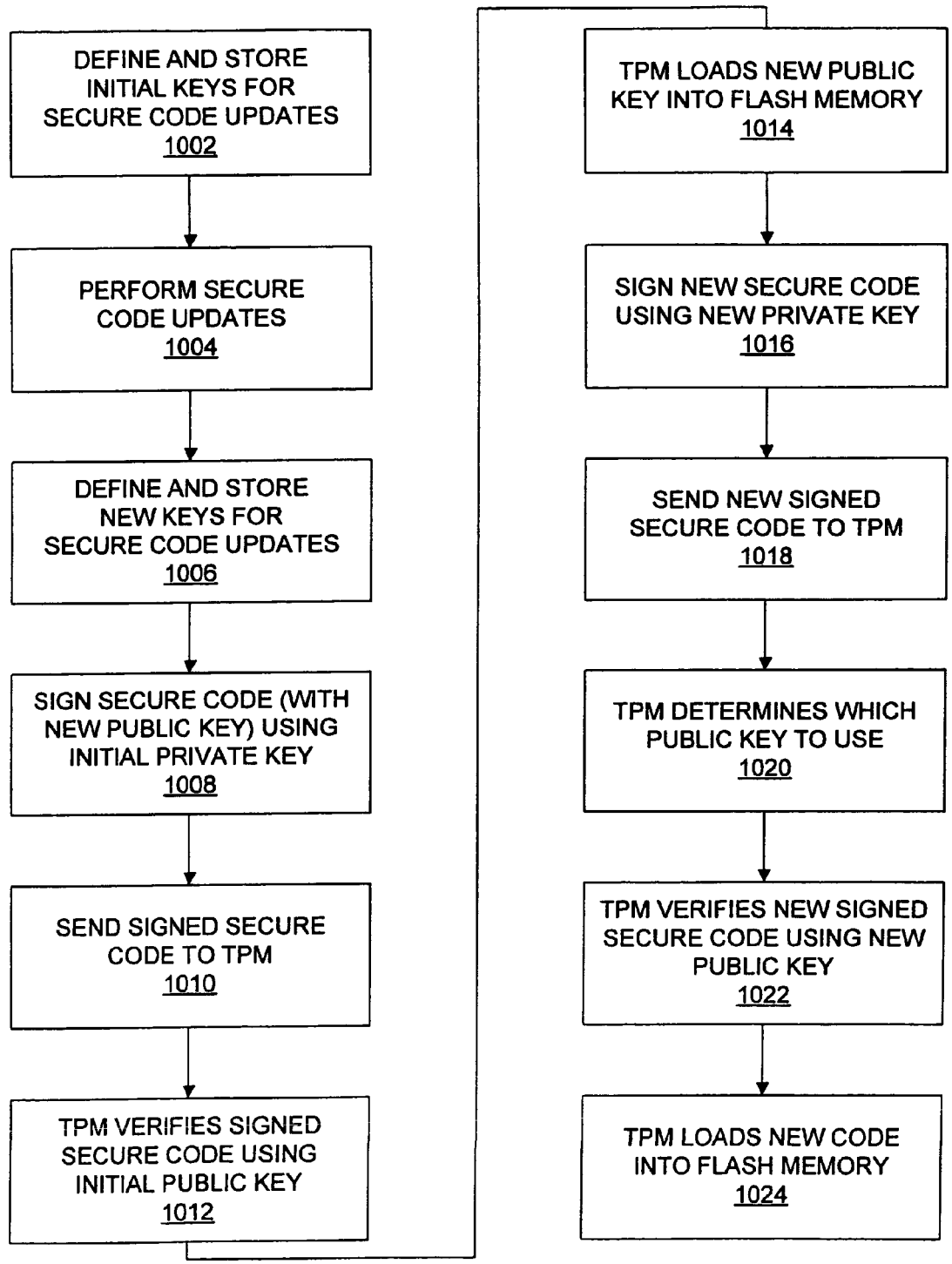
FIG. 10 is a flow chart of one embodiment of key upgrade operations that may be performed in accordance with the invention.

In some embodiments multiple signing keys may be used to support firmware for different OEMs and/or to prevent replay attacks. The example of FIG. 10 illustrates how multiple secure code loads may use multiple authentication keys.

As represented by block 1002, a first private-public key pair (e.g., an RSA asymmetric key) is defined. The corresponding private key (Ksc_init) may be securely maintained within a secure signing environment. This private key is kept secret and may be used to sign at least the first secure code load for all OEM's. The corresponding public key (Ksc_init-pub) may be stored in the TPM (e.g., in on-chip ROM).

A fixed RSA private key (Ksc_init) may be used to perform the signature over the secure code during a first secure code load and, until the keys are changed, subsequent secure code loads (block 1004). Thus, the TPM will initially use the corresponding public key (Ksc_init-pub) to verify any new secure code. The secure code may include, for example, one or more of new secure code, a new function table and a secure code descriptor.

In some embodiments a secure code load may be used to send a secure code descriptor with a new public key to the TPM. In this case, a second private-public key pair is defined (block 1006). Again, the corresponding private key may be securely maintained within the secure signing environment. The corresponding public key (Ksc_oem0-pub) may be incorporated into the secure code descriptor, signed using the initial private key (block 1008) and then sent to the TPM (block 1010).

The upgrade commands are used to load the secure code image to flash. The upgrade start command verifies the new secure code descriptor and stores the new code descriptor in TPM volatile memory. Upon successful verification, the TPM may be deactivated, and the on-chip function table may be referenced. Flash may be securely updated to clear the firmware loaded field in the secure code descriptor. The upgrade update command securely writes each block of secure code into flash. Multiple update commands may be called to completely load the new secure code load. The upgrade complete contains a signature that was calculated by the manufacturer over the secure code image. Thus, as represented by block 1012, the TPM firmware verifies the signature calculated over the secure code using the RSA public verification key (Ksc_init-pub).

Upon successful verification, the new secure code descriptor may be securely copied to flash. Thus, once the secure code load has been successfully loaded into the TPM, the new RSA public verification key (Ksc_oem0-pub) may be loaded into the external flash (block 1014).

For a subsequent secure code load the signing environment uses the new private key to sign the secure code (block 1016). The secure signing environment then sends the new signed secure code to the TPM (block 1018) During the new secure code load, after the operating system TPM driver is loaded, the upgrade information request command may be used by TPM software to determine which Ksc key is used to load the next set of secure code information (block 1020). In addition, the TPM software may determine the TCG version of the current firmware. TPM software may thus determine whether a more up-to-date set of secure code information exists for the current RSA public verification key (Ksc_oem0-pub).

The upgrade commands are used to load the secure code image to flash. The TPM firmware verifies the signature calculated over the secure code using the Ksc_oem0-pub key (block 1022). Once verified, the new code may be loaded into the flash (1024).

Reiterating, when secure code including a new Ksc public key has been loaded into flash, the TPM uses the new Ksc public key that is stored in the secure code descriptor to verify any new signed code. Conversely, when new secure code has not been loaded into flash, the TPM uses the initial Ksc public key that is stored, for example, in on-chip ROM.

A system constructed in accordance with the invention may advantageously be configured to resist attacks from malicious persons (e.g., hackers) and/or programs (e.g., viruses).

In the event an attacker is able to read or write the external flash at will, the following techniques may be used to thwart potential attacks. First, by authenticating the data that is stored in the flash, the system may be able to detect attempts to modify the flash function table, flash read-only data or secure code block. On an authentication failure, the TPM may jump to an exception handler. Second, an attacker may attempt to replace the current flash function table with an older flash function table. This could cause the processor to jump to an unexpected address. An attacker could also replace the flash read-only data or a secure code block. Such attacks may be prevented by authenticating the firmware hash field. Third, an attacker may attempt to reorder chunks of secure code blocks. This attack may be prevented by including the logical flash address in the HMAC-SHA1 digest. Fourth, an attacker may attempt to attack the flash keys by using the TPM as an oracle to encrypt arbitrary data. This attack may be prevented by restricting use of the TPM's keys.

In the event an attacker is able issue upgrade commands, the following techniques may be used to thwart potential attacks. First, the attacker may attempt to load arbitrary secure code descriptors or secure code blocks. This attack may be prevented by verifying the upgrade start and upgrade complete signatures. Second, the upgrade start command from one set of secure code information may be followed by upgrade updates from a second set of secure code information. Assuming the verification public key was not changed, this attack may be prevented by calculating a SHA1 digest across all upgrade commands.

The following techniques may be used to thwart attacks that could potentially result in a permanent loss of data. First, the attacker may attempt to remove power when the secure code descriptor is being updated. This attack may be prevented by double-buffering the secure code descriptor in flash. Second, the attacker may attempt to overwrite TPM flash data by issuing multiple upgrade update commands. This attack may be prevented by checking the maximum number of blocks (e.g., 256 byte blocks) that are written to flash. In addition, the TPM may only issue upgrade update or upgrade complete commands when the previous command was issued successfully.

Given the teachings herein, it will be apparent that a system constructed in accordance with the invention may be implemented in a variety of ways and may, therefore, incorporate a variety of components and operations. For example, the teachings of the invention may be implemented in a variety of processing systems other than those specifically mentioned. The teachings of the invention also may be applied to data memories or other components other than those specifically mentioned. Moreover, a variety of cryptographic techniques and algorithms other than those specially mentioned may be used to support secure updates. In addition, the teachings of the invention may be used to update different types of information including, but not limited to, the forms of information specifically mentioned. Hence the teachings of the invention are not limited to the specific structure, components and operations disclosed herein.

It should be appreciated that the various components and features described herein may be incorporated in a system independently of the other components and features. For example, a system incorporating the teachings herein may include various combinations of these components and features. Thus, not all of the components and features described herein may be employed in every such system.

Different embodiments of the invention may include a variety of hardware and software processing components. In some embodiments of the invention, hardware components such as controllers, state machines and/or logic are used in a system constructed in accordance with the invention. In some embodiments code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire while other signals may consist of light pulses transmitted over an optical fiber.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise flash memory, one-time-programmable (OTP) memory or other types of data storage devices.

In summary, the disclosure herein generally relates to an improved secure code load mechanism. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method comprising:
   storing a public key of a first private-public key pair in at least one data memory associated with a cryptographic processing system comprising a hardware processor;
   receiving, by the cryptographic processing system, a public key of a second private-public key pair signed with a private key of the first private-public key pair;
   verifying, by the cryptographic processing system, the signed public key using the public key of the first private-public key pair;
   storing the public key of the second private-public key pair in the at least one data memory;
   receiving, by the cryptographic processing system, secure code signed with a private key of the second private-public key pair;
   verifying, by the cryptographic processing system, the signed secure code using the public key of the second private-public key pair; and
   storing the secure code in the at least one data memory, the secure code including one or more functions and a new function table that identifies a location of one or more of the functions;
   wherein one or more original functions are stored in a first data memory located internal to the cryptographic processing system, and wherein the storing the secure code in the at least one data memory comprises storing, by the cryptographic processing system, in a second data memory located external to the cryptographic processing system, the secure code including one or more new or updated functions and the new function table, the new function table identifying a location of the one or more of the original functions stored in the first data memory and a location of the one or more of the new or updated functions stored in the second data memory.

2. The method of claim 1 and further comprising determining, by the cryptographic processing system, whether to use the public key of the first private-public key pair or the public key of the second private-public key pair based on a presence of the public key of the second private-public key pair in the data memory.

3. The method of claim 1 wherein the secure code comprises code, including the one or more functions, and a function table.

4. The method of claim 1 and further comprising encrypting the public key of the second private-public key pair before it is stored in at least one data memory.

5. The method of claim 1 and further comprising encrypting the secure code before it is stored in the at least one data memory.

6. The method of claim 1 wherein a portion of the at least one data memory comprises a flash memory located external to the cryptographic processing system.

7. The method of claim 1 wherein the secure code comprises a secure code descriptor.

8. The method of claim 1 wherein the private key of the first private-public key pair and the private key of the second private-public key pair are securely maintained within a FIPs Level 3 hardware security module.

9. A method comprising:
   storing, by a cryptographic processing system comprising a hardware processor, a first public key of a first private-public key pair;
   performing, by the cryptographic processing system, a first secure code update using the first private-public key pair to receive a second public key of a second private-public key pair by the cryptographic processing system; and
   performing, by the cryptographic processing system, a second secure code update using the second private-public key pair, wherein the performing a second secure code update includes receiving and storing, by the cryptographic processing system, new code including one or more functions and a new function table that identifies a location of one or more of the functions;
   wherein one or more original functions are stored in a first data memory located internal to the cryptographic processing system, and wherein the performing a second secure code update includes storing, by the cryptographic processing system, in a second data memory located external to the cryptographic processing system, the new code including one or more new or updated functions and the new function table, the new function table identifying a location of the one or more of the original functions stored in the first data memory and a location of the one or more of the new or updated functions stored in the second data memory.

10. The method of claim 9 wherein the receiving and storing comprises receiving and encrypting the new code and the function table and storing the encrypted new code and function table in a data memory associated with the cryptographic processing system.

11. The method of claim 10 wherein the data memory comprises a flash memory located external to the cryptographic processing system.

12. The method of claim 9 and further comprising encrypting the second public key before it is stored in a data memory associated with the cryptographic processing system.

13. The method of claim 12 wherein the data memory comprises a flash memory located external to the cryptographic processing system.

14. The method of claim 9 wherein performing the first secure code update comprises updating, by the cryptographic processing system, a secure code descriptor.

15. An apparatus comprising:
   a cryptographic processing system including a hardware processor and a first data memory located internal to the cryptographic processing system;
   a second data memory located external to the cryptographic processing system; and wherein the hardware processor is configured to execute computer instructions to cause the cryptographic processing system to perform the following:

storing a first public key of a first private-public key pair in one of the first data memory or the second data memory;
performing a first secure code update using the first private-public key pair to receive a second public key of a second private-public key pair; and
performing a second secure code update using the second private-public key pair, wherein the performing a second secure code update includes receiving and storing in the second data memory by the cryptographic processing system, new code including one or more functions and a new function table that identifies a location of one or more of the functions;
wherein one or more original functions are stored in the first data memory located internal to the cryptographic processing system, and wherein the performing a second secure code update includes storing, by the cryptographic processing system, in the second data memory located external to the cryptographic processing system, the new code including one or more new or updated functions and the new function table, the new function table identifying a location of the one or more of the original functions stored in the first data memory and a location of the one or more of the new or updated functions stored in the second data memory.

* * * * *

UNITED STATES PATENT AND TRADEMARK OFFICE
CERTIFICATE OF CORRECTION

PATENT NO.         : 7,774,619 B2                                              Page 1 of 1
APPLICATION NO. : 11/250265
DATED              : August 10, 2010
INVENTOR(S)        : Timothy R. Paaske et al.

It is certified that error appears in the above-identified patent and that said Letters Patent is hereby corrected as shown below:

In column 28, line 14, in claim 8, delete "FIPs" and insert -- FIPS --, therefor.

Signed and Sealed this

Thirtieth Day of November, 2010

David J. Kappos
*Director of the United States Patent and Trademark Office*